United States Patent
Lee

(10) Patent No.: US 12,120,582 B2
(45) Date of Patent: Oct. 15, 2024

(54) METHOD, APPARATUS AND COMPUTER PROGRAM FOR BROADCAST DISCOVERY SERVICE IN WIRELESS COMMUNICATION SYSTEM, AND RECORDING MEDIUM THEREFOR

(71) Applicant: INTELLECTUAL DISCOVERY CO., LTD., Seoul (KR)

(72) Inventor: Jeaho Lee, Cheongju-si (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 368 days.

(21) Appl. No.: 17/596,105

(22) PCT Filed: Jun. 2, 2020

(86) PCT No.: PCT/KR2020/007134
§ 371 (c)(1),
(2) Date: Dec. 3, 2021

(87) PCT Pub. No.: WO2020/246768
PCT Pub. Date: Dec. 10, 2020

(65) Prior Publication Data
US 2022/0256314 A1 Aug. 11, 2022

(30) Foreign Application Priority Data
Jun. 3, 2019 (KR) .................. 10-2019-0065459

(51) Int. Cl.
*H04W 4/00* (2018.01)
*H04W 4/06* (2009.01)
(Continued)

(52) U.S. Cl.
CPC .............. *H04W 4/06* (2013.01); *H04W 4/80* (2018.02); *H04W 8/005* (2013.01); *H04W 76/14* (2018.02)

(58) Field of Classification Search
CPC ......... H04W 4/06; H04W 16/14; H04W 4/80; H04W 8/005
See application file for complete search history.

(56) References Cited

U.S. PATENT DOCUMENTS

2014/0153489 A1* 6/2014 Perras .................. H04W 60/00 370/328
2015/0163635 A1 6/2015 Leppanen et al.
(Continued)

FOREIGN PATENT DOCUMENTS

CN 102076060 A 5/2011
CN 104471910 A 3/2015
(Continued)

OTHER PUBLICATIONS

Communication dated Apr. 5, 2023 issued by the European Patent Center in application No. 20819262.5.
(Continued)

*Primary Examiner* — Abdelnabi O Musa
(74) *Attorney, Agent, or Firm* — Sughrue Mion, PLLC

(57) ABSTRACT

Disclosed are a method, an apparatus and a computer program for performing a broadcast discovery or scanning service in a wireless communication system, and a recording medium therefor. A method by which a second device performs scan offloading on a first device in a wireless communication system, according to one embodiment of the present disclosure, comprises the steps of: transmitting, to the first device, information for indicating that the second device performs scanning instead of the first device; determining, by the second device, a target broadcast source for the first device; and transmitting, to the first device, information about the target broadcast source.

18 Claims, 28 Drawing Sheets

(a)

(b)

(51) Int. Cl.
  *H04W 4/80* (2018.01)
  *H04W 8/00* (2009.01)
  *H04W 76/14* (2018.01)

(56) References Cited

U.S. PATENT DOCUMENTS

| | | |
|---|---|---|
| 2015/0351010 A1 | 12/2015 | Kumar |
| 2016/0299739 A1 | 10/2016 | Song |
| 2017/0272270 A1 | 9/2017 | Gu et al. |
| 2017/0279808 A1 | 9/2017 | Kwon et al. |
| 2018/0091361 A1* | 3/2018 | Smith .................... H04L 63/08 |
| 2018/0160334 A1* | 6/2018 | Deshpande ........... H04W 36/22 |
| 2021/0400096 A1* | 12/2021 | Lee ..................... H04L 65/1094 |
| 2022/0159436 A1* | 5/2022 | Lee ..................... H04N 21/4363 |
| 2022/0201452 A1* | 6/2022 | Lee .......................... H04B 5/77 |
| 2023/0064205 A1* | 3/2023 | Sirur ..................... H04L 65/611 |
| 2023/0269012 A1* | 8/2023 | Dong ...................... H04S 1/007 |
| | | 381/311 |

FOREIGN PATENT DOCUMENTS

| | | |
|---|---|---|
| CN | 106465244 A | 2/2017 |
| KR | 10-2016-0035535 A | 3/2016 |
| KR | 1020170094555 A | 8/2017 |
| KR | 10-2018-0034423 A | 4/2018 |
| KR | 10-1899744 B2 | 9/2018 |
| WO | 2014/182377 A2 | 11/2014 |
| WO | 2015/183877 A1 | 12/2015 |
| WO | 2016/036206 A2 | 3/2016 |

OTHER PUBLICATIONS

Office Action issued Jun. 22, 2023 in Chinese Application No. 202080053673.7.

International Search Report for PCT/KR2020/007134 dated, Aug. 31, 2020 (PCT/ISA/210).

* cited by examiner

FIG.1
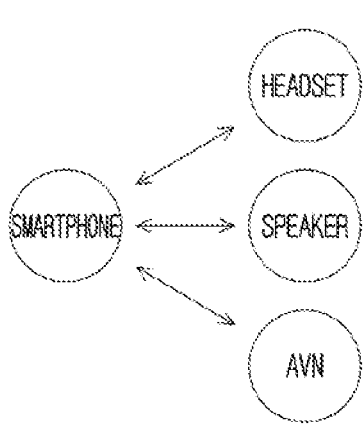
(a)
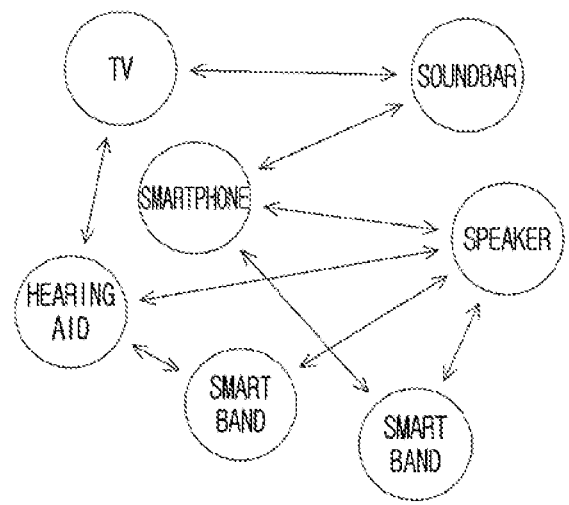
(b)

METHOD, APPARATUS AND COMPUTER PROGRAM FOR BROADCAST DISCOVERY SERVICE IN WIRELESS COMMUNICATION SYSTEM, AND RECORDING MEDIUM THEREFOR

CROSS REFERENCE TO RELATED APPLICATIONS

This application is a National Stage of International Application No. PCT/KR2020/007134 filed Jun. 2, 2020, claiming priority based on Korean Patent Application No. 10-2019-0065459 filed Jun. 3, 2019.

TECHNICAL FIELD

The present disclosure relates to a broadcast discovery service in a wireless communication system, more specifically, to a method, an apparatus, a computer program, and a recording medium thereof for a client to perform broadcast discovery for a server.

BACKGROUND ART

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

The Bluetooth standard includes various profiles. For example, the Hands-Free Profile (HFP) defines what is necessary for one device to function as an audio gateway (AG) such as a smartphone and another device to function as a hands-free device such as a headset. In addition, A2DP (Advance Audio Distribution Profile) defines what is necessary for one device to function as an audio source such as a music player and another device to function as an audio sink such as a speaker.

As the spread of wireless devices increases recently, the demand for transmitting and receiving audio data in various topologies of many-to-many or M-to-N connection types is increasing. For example, streaming services that require a 5.1 channel environment are emerging, and it is being discussed to support a 5.1 channel environment using a plurality of Bluetooth portable speakers, breaking away from the limitations of a conventional 5.1 channel dedicated wired speaker. However, since the conventional Bluetooth audio technology was mainly developed in consideration of a use case of a one-to-one connection between two devices, it is not suitable for supporting audio data transmission/reception between multiple devices and delay is a big problem. In addition, as the number of Bluetooth audio devices increases, there is a problem in that power consumption for searching for peripheral devices increases.

In addition, in order to reduce power consumption of the device for searching for a peripheral device, it may be considered that another device searches for, discovers, or scans a peripheral device on behalf of the corresponding device. However, there is no specific plan for this.

DISCLOSURE

Technical Problem

A technical problem of the present disclosure is to provide a method and apparatus for discovery off-loading or scan offloading in which the second device performs scanning on behalf of the first device.

The technical problems to be achieved in the present disclosure are not limited to the technical problems mentioned above, and other technical problems not mentioned will be clearly understood by those of ordinary skill in the art to which the present disclosure belongs from the following description.

Technical Solution

A method of performing scan offloading for a first device by a second device in a wireless communication system according to an aspect of the present disclosure may include: transmitting information indicating that the second device performs scanning on behalf of the first device to the first device; determining, by the second device, a target broadcast source for the first device; and transmitting information on the target broadcast source to the first device.

A method for a first device to perform scan offloading by a second device in a wireless communication system according to an additional aspect of the present disclosure may include: receiving, by the first device, information indicating that the second device performs scanning on behalf of the first device from the second device; receiving, by the first device, information on a target broadcast source from the second device; and performing synchronization with the target broadcast source based on the information on the target broadcast source.

A device for performing scan offloading for another device in a wireless communication system according to an additional aspect of the present disclosure may include: a memory; a transceiver; and a processor, wherein the processor is configured to: transmit, to the another device, information indicating that scanning is performed on behalf of the another device through the transceiver; determine a target broadcast source for the another device; and transmit, to the another device, information on the target broadcast source through the transceiver.

A device for performing scan offloading by another device in a wireless communication system according to an additional aspect of the present disclosure may include: a memory; a transceiver; and a processor; wherein the processor is configured to: receive, from the another device, information indicating that the another device performs scanning on behalf of the device through the transceiver; receive, from the another device, information on a target broadcast source through the transceiver; and perform synchronization with the target broadcast source based on information on the target broadcast source.

The features briefly summarized above with respect to the present disclosure are merely exemplary aspects of the detailed description of the present disclosure that follows, and do not limit the scope of the present disclosure.

Technical Effects

According to the present disclosure, a method and apparatus for discovery offloading or scan offloading in which the second device performs scanning on behalf of the first device may be provided.

The technical effects of the present disclosure are not limited to the above-described effects, and other effects not mentioned herein may be understood to those skilled in the art from the following description.

BRIEF DESCRIPTION OF DRAWINGS

FIG. 1 is a diagram exemplarily illustrating a conventional audio connection type and an audio connection type to which the present disclosure is applicable.

BEST MODE

Figure 2:
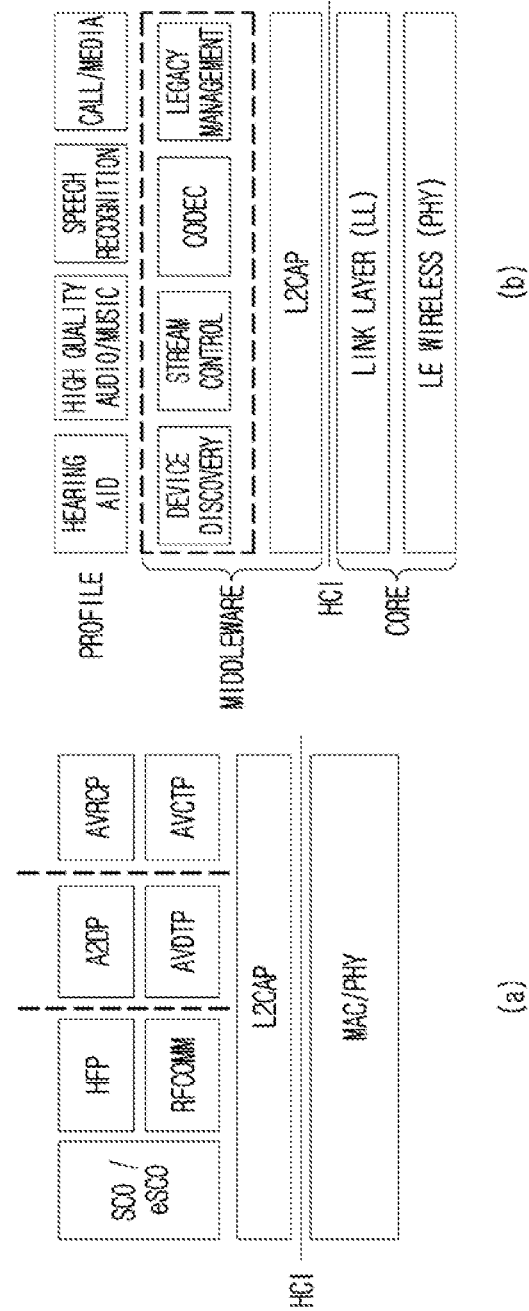
FIG. 2 is a diagram exemplarily illustrating a conventional audio-related protocol and an audio-related protocol stack to which the present is applicable.

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Definitions of terms used in the present disclosure are as follows.

An audio sink is an entity that receives audio data from an audio source.

An audio source is an entity that transmits audio data to the audio sink.

An audio channel is a single flow of coded or uncoded audio data.

An audio stream is a unidirectional logical communication channel that carries audio data flowing from the audio source to the audio sink. Audio data may flow on an audio stream session (ASS). An audio stream may carry audio data for one or more audio channels.

An audio group may include one or more synchronized audio streams.

A content type indicates a classification of content of an audio group. The classification may include whether the audio was initiated by the user. A content type indicates a classification of content of an audio group. The classification may include whether the audio was initiated by the user. Examples of the content type may include uncategorized audio (UncategorizedAudio), ringtone (Ringtone), system sound (SystemSound), satellite navigation (Satnav), call audio (CallAudio), media (Media), and the like.

Metadata is a variable-length data that describes and provides the context of audio data. Metadata may be defined for a higher layer.

An audio stream session (ASS) means to a unidirectional or bidirectional transmission/exchange process of an audio stream. An endpoint of an ASS corresponds to an audio input and/or audio output of an audio stream session, and may correspond to one device or a group of devices. The end of the ASS resides on the server and may be configured by the server or by the client. The server may store, change, and manage ASS state.

QoS (Quality of Service) means a quality of service for an audio stream and may correspond to a requirement for a specific service.

An audio location means a logical spatial rendering location intended for an audio channel within a spatial arrangement of a device for rendering audio. For example, the left and right location of a headset may correspond to an audio location. An audio location may be allocated to an audio channel.

CBIS (Connection Based Isochronous Stream) is a term defined in a core layer and is a concept corresponding to an audio stream in an ASS service. A unidirectional CBIS may have one audio stream, and a bidirectional CBIS may have two audio streams.

CBISS (Connection Based Isochronous Stream Set) is a term defined in a core layer and is a concept corresponding to an audio group in the ASS service.

An audio scene application (ASA) means an audio group performing a specific content type.

ASC (Audio Steam Capability) is a set of parameters necessary for configuring an audio session capability.

An audio advertisement is to discover the availability of ASA participation. An audio general advertisement is an audio advertisement that does not specify a target, and an audio directed advertisement is an audio advertisement for a specific target.

Isochronous data means data that is limited by time. For example, isochronous data may be time-dependent audio, such as television audio that needs to be synchronized with respect to an image of a video, or audio that needs to be synchronized and reproduced in multiple devices constituting a multi-channel.

An isochronous channel means a logical transmitting end used to transmit isochronous data from a transmitting device to one or more receiving devices.

An isochronous stream means a logical link carrying one or more isochronous channels.

FIG. 1 is a diagram exemplarily illustrating a conventional audio connection type and an audio connection type to which the present disclosure is applicable.

FIG. 1(a) illustrates an example of a BR/EDR audio connection type. In the case of BR/EDR, one-to-one connection type is supported. One device (e.g., a smartphone) may function as a central device, and may be connected one-to-one with each of several devices. That is, there may be multiple one-to-one connections. Accordingly, the service such as a phone call through a headset or music reproduction through a speaker may be supported. The center of service in this connection type is an audio source, and an audio sink such as a headset, a speaker, and AVN (Audio Video Navigation) may operate as a peripheral device of the audio source.

FIG. 1(b) illustrates an example of a BLE audio connection type. In the case of BLE, many-to-many connections may be supported. In this case, there may be a plurality of center devices such as a TV, a smart phone, and a gateway etc., and complex M-to-N connection may be configured. Accordingly, services of phone calls and music reproduction through the headset may be supported, and broadcast audio services such as alarms, doorbells, and advertising voices may be supported. The center of the service in this connection type is an audio sink, and the audio service may be used by moving multiple audio sources.

FIG. 2 is a diagram exemplarily illustrating a conventional audio-related protocol stack and an audio-related protocol stack to which the present disclosure is applicable.

FIG. 2 (a) illustrates an example of an audio-related protocol stack. L2CAP (Logical Link Control & Adaption Protocol) layer functions as arbitration and mediation between the upper layer and the lower layer. In the upper layer, protocols such as RFCOMM (Radio Frequency Communication), AVDTP (Audio/Video Distribution Transport Protocol), AVCTP (Audio/Video Control Transport Protocol) etc. and profiles such as HFP (Hands Free Profile), A2DP (Advanced Audio Distribution Profile), AVRCP (Audio/Video Remote Control Profile) etc. may be included. The lower layer may include a MAC/PHY layer. The MAC (Medium Access Control) layer may include a link manager and a link controller, and the PHY (Physical) layer may include a BR/EDR radio. In addition, Synchronous Connection Oriented (SCO)/extended SCO (eSCO) may provide a synchronous data communication path for voice. As such, in BR/EDR, a protocol stack may be designed for each profile. The L2CAP layer, the BR/EDR protocol, the Generic Access Profile (GAP), and the BR/EDR profile layer may be collectively referred to as the host layer, and the link manager, link controller, and BR/EDR radio layer may be referred to as the controller layer. The interface between the host and the controller may be referred to as a HCI (Host Controller Interface).

FIG. 2(b) illustrates an example of a BLE audio-related protocol stack. Unlike BR/EDR in which protocols are configured for each profile, in BLE, a common protocol stack for various profiles may be designed. This common protocol stack may be referred to as middleware. For example, a common protocol for various profiles such as hearing aids, high quality audio/music, voice recognition, and call/media in the form of middleware may be configured. For example, the middleware may include protocols such as device discovery, stream control (or stream management), codec, and legacy management. In addition, the core layer may include a link layer (Link Layer, LL), an LE Radio (i.e., a PHY layer), and the LL may include functions related to multicast support isochronous channels defined from Bluetooth 5.

In addition, the profile and middleware may be referred to as a host layer, the core layer may be referred to as a controller layer, and HCI may be defined between the host and the controller.

In addition to the host profile and protocol illustrated in FIG. 2(b), the host may include an LE profile, a generic access profile (GAP), a generic attribute profile (GATT), an Attribute (ATT) protocol, a security manager (SM), and the like.

Information transmitted from a host to a controller may be referred to as a HCI command packet. Information transmitted from a controller to a host may be referred to as a HCI event packet. In addition, HCI asynchronous data packets or HCI synchronous data packets may be exchanged between a host and a controller.

Also, in addition to the middleware profiles and services illustrated in FIG. 2(b), the middleware may include various profiles and/or services as follows:

Audio Session Capability Service (ASCS): Audio Session Capability Service (ASCS) is a service that supports to advertise or discover capabilities related to an audio session;

Audio Stream Session Service (Audio Stream Session Service, ASSS): Audio Stream Session Service (ASSS) is a service that supports discovery, setup, establishment, control, and management related to an audio session;

Audio Input Management Service (AIMS): a service for managing audio input volume, etc.;

Audio Routing Service (ARS): a service for selecting the location of audio inputs and outputs;

Audio Middleware Profile (AMP): a basic profile for the behavior of a device to distribute audio;

Call Management Profile (CMP): a profile of the roles and procedures of interaction between two devices for a call;

Audio General Middleware Profile (AGMP): a basic profile that enables content and/or stream control;

Group Identification Service (GIS): a service for the discovery of devices belonging to a group. A Group Identification Service (GIS) or Group Identification Profile (GIP) may allow devices to be discovered as part of a group. A group is defined as a group of devices that operate together to support a specific scenario, and these devices may be referred to as group members. For example, a group of devices that respond to a control command together, such as a pair of hearing aids, a pair of earbuds, or a set of speakers that receive multichannel (e.g., 5.1CH) audio, may be such examples:

Audio Player Management Profile (APMP): a profile that supports the control or interaction of an audio player;

Audio Player Management Service (APMS): a service that supports the control or interaction of an audio player;

Microphone Management Profile: a profile for microphone state management;

Microphone Management Service: a service that supports interfaces and states for microphone state management;

Quick Service Discovery Service (QSDS): a service that supports quick discovery of services such as audio player management and call management;

Call Bearer Service: a service that supports management of a call interface and a call state for a bearer on a device;

Volume Management Profile: a profile that supports audio volume management of a device;

Volume Management Service: a service that supports the device's audio volume interface and state;

Volume Offset Management Service: a service for volume management for audio output.

Figure 3:
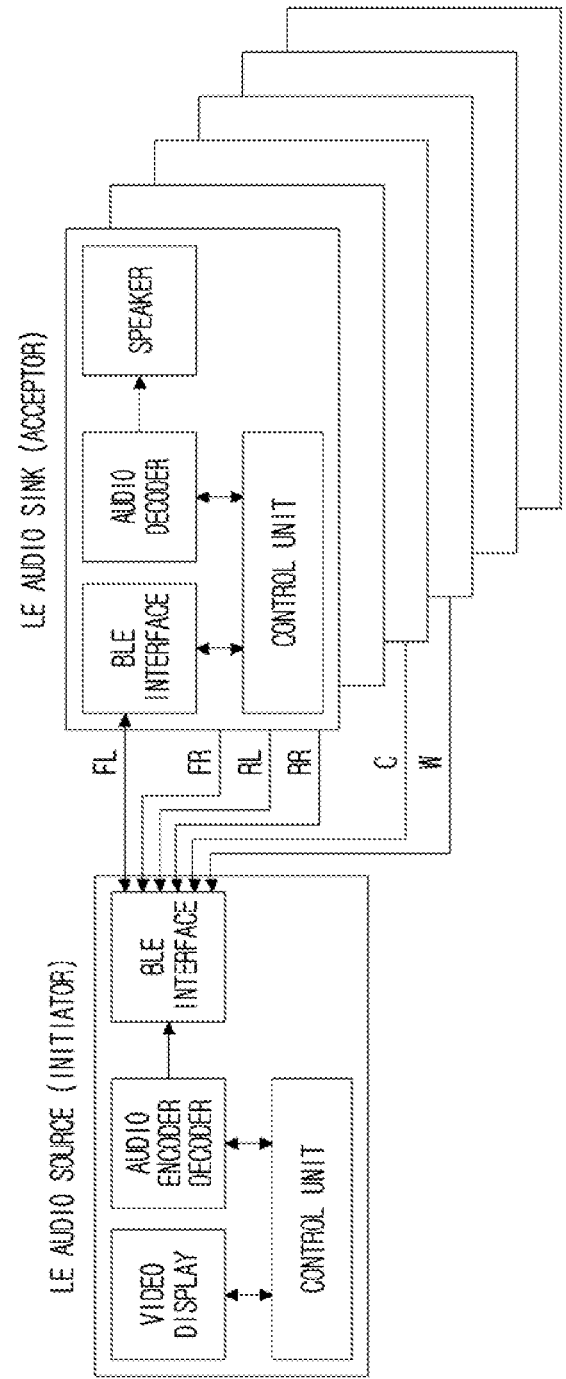
FIG. 3 is a diagram illustrating examples of 5.1 channel surround system hardware to which the present disclosure is applicable.

FIG. 3 illustrates examples of 5.1 channel surround system hardware to which the present disclosure is applicable.

In FIG. 3, a LE audio source device may perform a function of an initiator, and a LE audio sink device may perform a function of an acceptor. The initiator means a device that initiates an audio session, and the acceptor means a device that accepts the initiation of an audio session. Here, a source is not always the initiator or a sink is not always the acceptor, and the source may be the acceptor or the sink may be the initiator.

For example, an audio source may be a TV device, and an audio sink may be a speaker device. The audio source may transmit audio data to the audio sink. In addition, the audio source may receive feedback data from the audio sink. A plurality of audio sinks may receive audio data corresponding to one of 5.1 channels, respectively, FL (Front Left), FR (Front Right), RL (Rear Left), RR (Rear Right), C (Center), and W (Woofer) and output it through the speaker.

An audio encoder or decoder may support various audio formats. For example, the audio format may include Bluetooth Low Energy Audio Codec (BLEAC), Dolby 5.1CH, Digital Surround Sound (DTS), and the like, and the characteristics of each format are as follows. BLEAC is a mono codec, and the 96 kbps transmission rate of BLEAC may provide the same quality as 256 kbps of SBC (Sub-Band Codec) and 200 kbps of MP3. Dolby 5.1CH may support a 48 kHz sampling rate, support 1 to 5.1 (or 1 to 6) channels and support a transmission rate of up to 448 kbps. DTS may support 48 kHz or 96 kHz sampling rate, support 2 to 6.1 channels, and support transmission rates of 768 kbps half rate and 1,536 kbps full rate.

Figure 4:
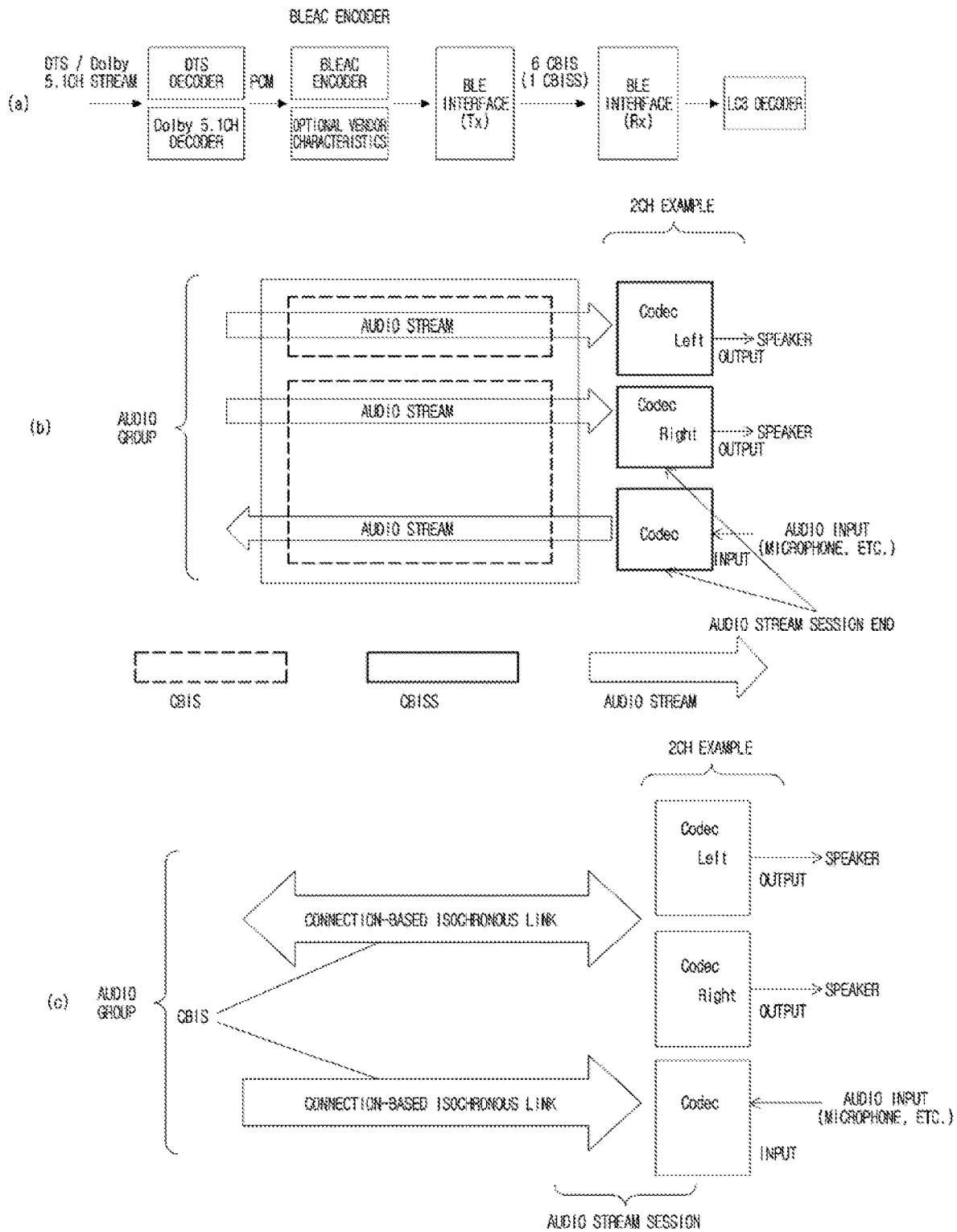
FIG. 4 is a diagram illustrating an audio data encoding/decoding process to which the present disclosure is applicable.

FIG. 4 is a diagram illustrating an audio data encoding/decoding process to which the present disclosure is applicable.

Referring to FIG. 4(a), a DTS format stream or a Dolby 5.1CH format stream may be input to a DTS decoder or a Dolby 5.1CH decoder of the transmitting end (Tx) and an audio signal in a PCM (Pulse-Code Modulation) format may be output. The PCM signal may be input to the BLEAC encoder and output as an audio signal in the BLEAC format.

Here, optional vendor-specific information may be added. The BLEAC signal may be transmitted to the BLE interface of the receiving end (Rx) through the BLE interface. The receiving end may process the BLEAC signal through the BLEAC decoder and convert it into a signal that can be output through the speaker.

Here, a plurality of streams may be transmitted from a transmitting end to a plurality of receiving ends. For example, each of the plurality of streams may include an audio signal corresponding to one channel among 5.1 CHs. The plurality of streams may be received at different times from the plurality of receiving ends, but have isochronous properties that require play or rendering at the same time, and these streams may be called CBIS (Connection Based Isochronous Stream). That is, six CBISs corresponding to 5.1CH may be transmitted from a transmitting end to a receiving end, and a set of these six CBISs may be referred to as one CBISS (Connection Based Isochronous Steam Set).

FIGS. 4(b) and 4(c) conceptually illustrates audio streaming through a plurality of streams. One or more audio streams may correspond to CBIS, and an audio group may correspond to CBISS. For example, one audio stream may correspond to one CBIS, and two or more audio streams may correspond to one CBIS. A plurality of CBISs may be included in one audio group or CBISS.

Figure 5:
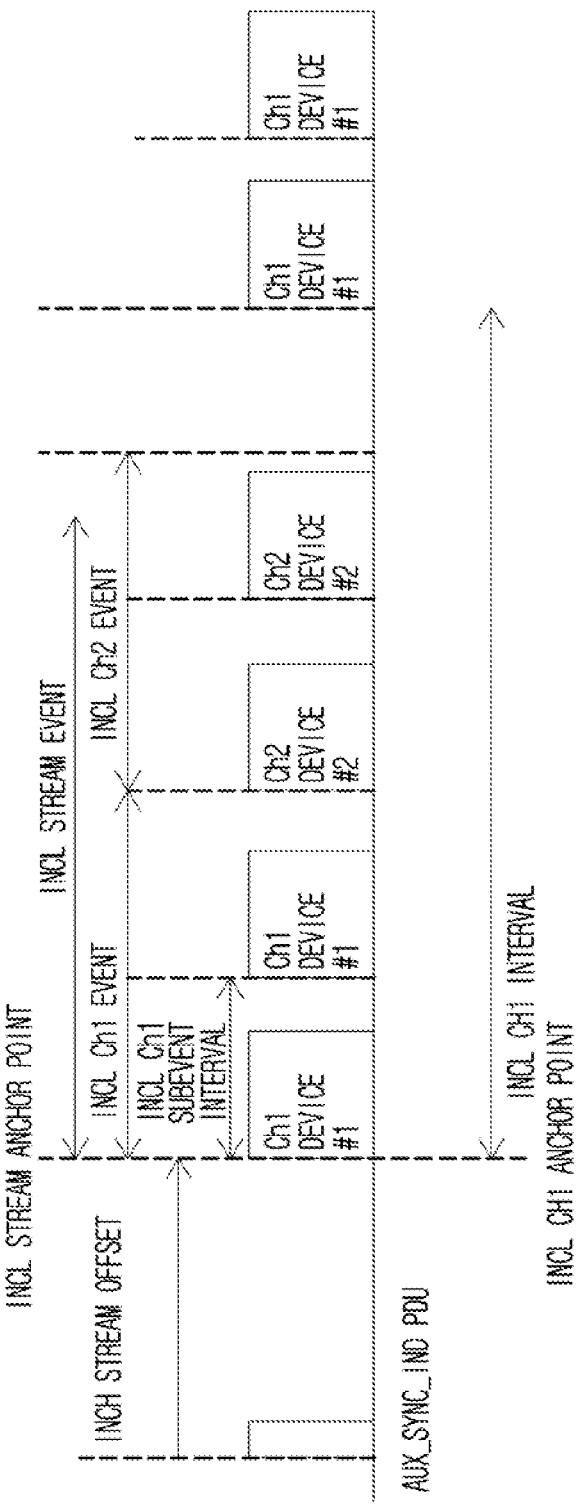
FIG. 5 is a diagram illustrating an example of channel allocation for two devices to which the present disclosure is applicable.

FIG. 5 is a diagram illustrating an example of channel allocation for two devices to which the present disclosure is applicable.

The receiving end may initiate stream reception according to timing information provided by the transmitting end. For example, the timing information may indicate a time point after a predetermined offset from a time point at which a data unit including the timing information is transmitted. The receiving end may receive audio data corresponding to one or more channels included in the stream. For example, a plurality of channels included in one stream may be allocated to a plurality of receiving ends, respectively. A plurality of channels (or a plurality of audio data) included in one stream may be transmitted in a time division multiplexing (TDM) method. For example, audio data of a first channel may be transmitted at a first timing, and audio data of a second channel may be transmitted at a second timing.

The broadcast receiving end may detect a currently obtainable broadcast audio stream, a stream offset value, a stream interval value, and the like, by using information included in a data unit periodically advertised by the transmitting end.

In the case of an Isochronous Non-Connection Link (INCL), which is a connectionless-based isochronous link, an isochronous channel may be transmitted/received (e.g., in a broadcast manner) without a connection between a source device and a sink device. From information such as BSG (Broadcast Synch Group) included in the AUX_SYNC_IND Protocol Data Unit (PDU) advertised by the transmitting end, the receiving end may check the INCL stream offset or BSG offset, and determine the anchor point timing. INCL stream transmission may start from the anchor point. A timing difference between two consecutive anchor points may be defined as an interval (e.g., an INCL CH1 interval or an ISO interval of FIG. 5). One or more sub-events may be included in the stream transmission event.

In the example of FIG. 5, one audio stream may include audio data for two channels. The first channel (CH1) may be allocated to the first device (device #1), and the second channel (CH2) may be allocated to the second device (device #2). At one or more timings after the anchor point, CH1 included in the INCL stream may be transmitted to the device #1, and thereafter, CH2 may be transmitted to the device #2 at one or more timings. In addition, the INCL stream event may include an event for CH1 and an event for CH2. An event for CH1 may include two sub-events. An event for CH2 may include two sub-events. A timing difference between sub-events may be defined as a sub-event interval.

Isochronous audio data may have a limited lifetime. That is, the audio data may be invalidated after the predetermined time has expired. For example, a predetermined timeout value may be defined in the ICL channel, and isochronous audio data transmitted to a plurality of devices may be discarded after the predetermined timeout value has expired. For example, a timeout may be expressed as a number of sub-events.

Figure 6:
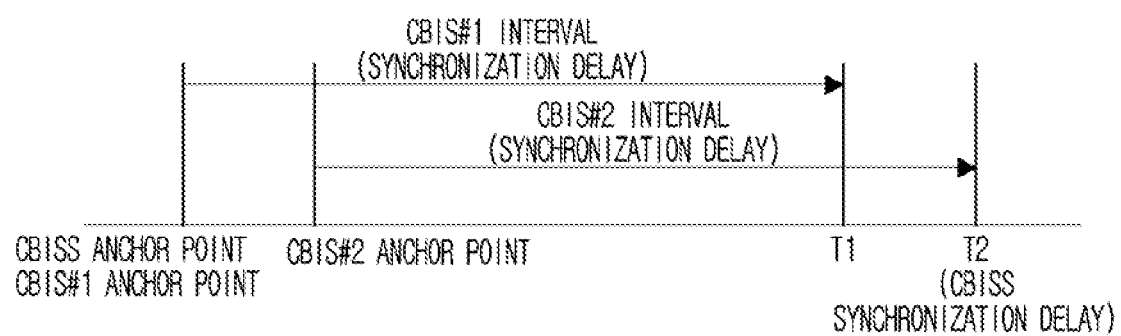
FIG. 6 is a diagram for describing a synchronization delay of two streams to which the present disclosure is applicable.

FIG. 6 is a diagram for describing a synchronization delay of two streams to which the present disclosure is applicable.

It is assumed that a plurality of streams are included in one audio group, and the plurality of streams have isochronism required to be reproduced at the same time. A plurality of streams may be transmitted from one device or may be transmitted from different devices. Also, the plurality of streams may be received by one device or may be received by different devices.

Since the Bluetooth communication method does not support simultaneous transmission of a plurality of streams, the plurality of streams may be transmitted in the TDM method on different time resources (or timings) according to a predetermined order. In this case, a difference may occur in the transmission timing of the plurality of streams, and accordingly, a difference may also occur in the reception timing of the plurality of streams. In addition, since a plurality of streams are required to be reproduced simultaneously, the stream received first cannot be reproduced first, but may be reproduced after waiting until the last stream is received. That is, a synchronization delay may occur until a timing at which reception of all streams is completed.

In the example of FIG. 6, the first stream (CBIS #1) and the second stream (CBIS #2) may be required to be reproduced simultaneously, and may be included in one CBISS. The CBISS anchor point may be same as the anchor point of CBIS #1, and after the CBIS #1 audio data may be transmitted, CBIS #1 audio data subsequent to the time point (e.g., T1) after the CBIS #1 interval may be transmitted. Next, after CBIS #2 audio data is transmitted from the anchor point of CBIS #2, CBIS #2 audio data subsequent to a time point after the CBIS #2 interval (e.g., T2) may be transmitted. After all streams included in one CBISS are received, they may be reproduced simultaneously. That is, the audio data of CBIS #1 and CBIS #2 may be processed and reproduced at the time of completion of reception of CBIS #2, which is transmitted relatively late.

Here, the synchronization delay of the CBISS may be defined as a time interval until the reception completion time (T2) of CBIS #2, which is received relatively late from the CBISS. For example, the later time point among the reception completion time T1 of CBIS #1 and the reception completion time T2 of CBIS #2 may be determined as the synchronization delay of the CBISS. That is, a later reception completion time among synchronization delays of a plurality of streams may be determined as a synchronization delay of the CBISS. Specifically, when CBIS #1 and CBIS #2 are bundled into the same single CBISS, the previously received stream CBIS #1 may be reproduced after waiting until the received stream CBIS #2 information is transmitted.

The transmitting end (Tx) may inform the receiving end (Rx) of an expected delay value calculated in consideration of the number of CBISs, CBIS events, sub-events, and intervals in advance. For example, the transmitting end may inform the receiving end of the expected delay value when configuring the channel.

In the case of a connection-based isochronous connection link (ICL), since the transmitting end and the receiving end are connected, the receiving end may inform the transmitting end of the actual delay value.

In the case of INCL, since the transmitting end and the receiving end are not connected, the receiving end cannot inform the transmitting end of the actual delay value. Even if the delay value may be informed from the receiving end to the transmitting end, the transmitting end cannot control the playback time of a specific device in order to synchronize the plurality of devices.

For example, even in the case of INCL, when a plurality of CBISs (e.g., six CBISs corresponding to six channels of 5.1CH) are included in one CBISS, the transmitting end may receive feedback from the receiver to adjust synchronization. Through the feedback, the receiving end may inform the transmitting end of its delay information.

Figure 7:
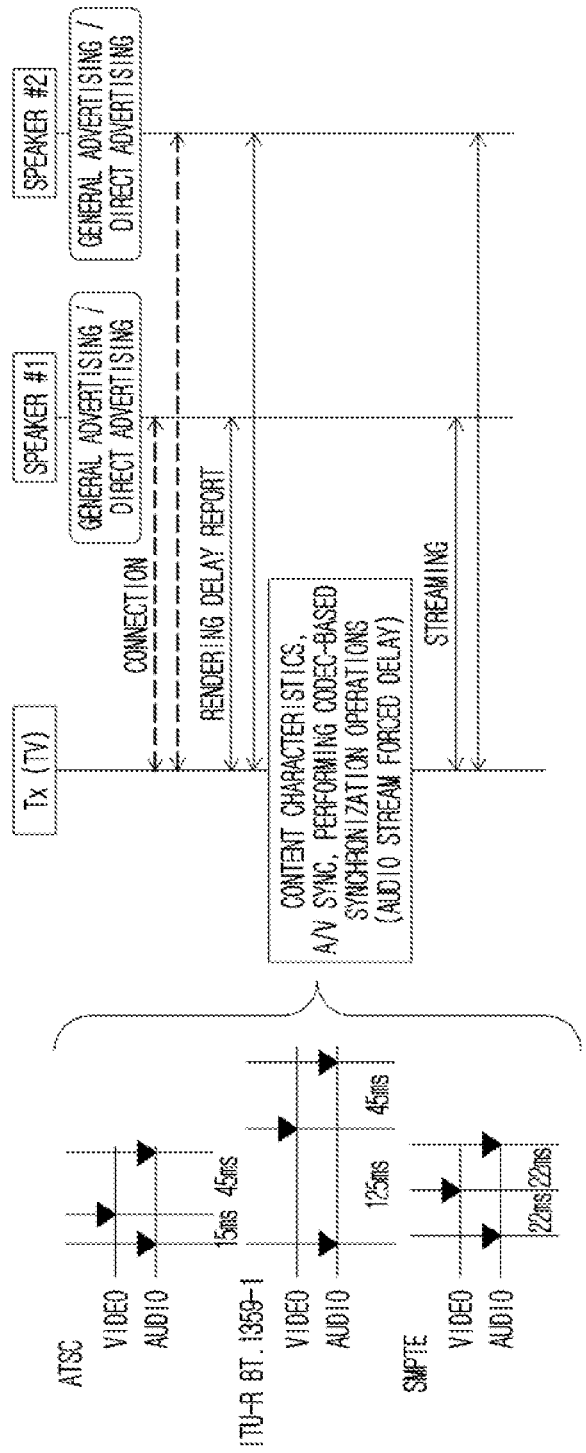
FIG. 7 is a diagram for describing a broadcast operation for a plurality of devices to which the present disclosure is applicable.

FIG. 7 is a diagram for describing a broadcast operation for a plurality of devices to which the present disclosure is applicable.

The audio source device may calculate a synchronization delay value for simultaneous reproduction of isochronous streams and transmit it to a plurality of audio sink devices. Each of the sink devices may determine the playback timing based on the delay value provided from the source device. That is, since the source device cannot accurately know the amount of time the sink device takes to receive and process audio data, the sink device may provide the delay value as basic information for determining the playback timing. The sink device may determine a reproduction timing according to its device characteristics and reproduce audio data.

For example, in an Isochronous Broadcast operation, a source device (e.g., a TV) may calculate a transmission delay, a rendering delay, etc., and transmit to a sink device (e.g., speaker). The sink device may adjust playback or rendering timing of audio data by reflecting the received delay value. Since device characteristics are different for each sink device manufacturer, the actual playback timing may be determined by the sink device.

If the sink device can transmit information to the source device, the sink, the sink device may calculate a delay value and transmit to the source device. Accordingly, the source device may determine the transmission timing based on the delay value provided from the sink device.

For example, a feedback channel may be formed through which a sink device (e.g., a speaker) may communicate information to a source device (e.g., a TV). In this case, a unicast operation based on an isochronous connection may be performed. The sink device may calculate a rendering delay value and transmit it to the source device through a feedback channel. Accordingly, the source device may adjust the transmission time of the audio data by reflecting the delay value provided from the sink device.

Referring to FIG. 7, an isochronous stream operation is exemplarily illustrated in the case where a transmitting end is a TV, and two receiving ends are a first speaker (speaker #1) and a second speaker (speaker #2). The first speaker may be allocated a first stream/channel (e.g., RR channel in 5.1CH), and the second speaker may be allocated a second stream/channel (e.g., RL channel in 5.1CH).

The first and second speakers may transmit an audio general advertisement or an audio directed advertisement, respectively. At least one of the TV and the first speaker or the second speaker may or may not be connected to each other.

When at least one of the TV and the speaker is connected, the speaker may calculate a rendering delay value and report it to the TV. When the TV and the speaker are not connected, the TV may calculate the transmission delay, rendering delay value, and the like, and send it to the speaker.

The TV may perform a synchronization operation in consideration of audio content characteristics, audio/video synch, codec characteristics, and the like, and forcibly apply a delay to a specific audio stream. For example, since the audio codec encoding/decoding delay is different from 40 ms for BLEAC, 200 ms for SBC, 100 ms for APT-X, etc., the delay value may be determined according to codec characteristics. In addition, since characteristics of A/V content are different according to games, movies, animations, and the like, a delay value may be determined in consideration of this. Also, a delay value may be determined in consideration of a difference between a media clock and a clock of the BLE interface. The media clock may be confirmed through A/V time scale information.

In addition, as shown on the left side of FIG. 7, a delay value may be determined in consideration of audio/video signal processing time defined in various broadcasting standards. For example, the time interval between audio-video-audio is 15 ms and 45 ms in Advanced Television Systems Committee (ATSC), 125 ms and 45 ms in ITU-R BT.1359-1, and SMPTE (Society of Motion Picture and Television Engineers) It is defined as 22 ms and 22 ms, and a delay value may be determined in consideration of these time intervals.

The TV may configure the rendering delay value of each stream and inform the speaker, or determine the transmission timing of the stream based on the delay value provided from the speaker.

The TV may transmit a stream to the speaker based on the determined delay value. That is, the source device or the TV which is the transmitting end may exchange a delay value with the sink device and the speaker(s) which is the receiving end, and may perform an operation of synchronizing by reflecting the delay value.

Figure 8:
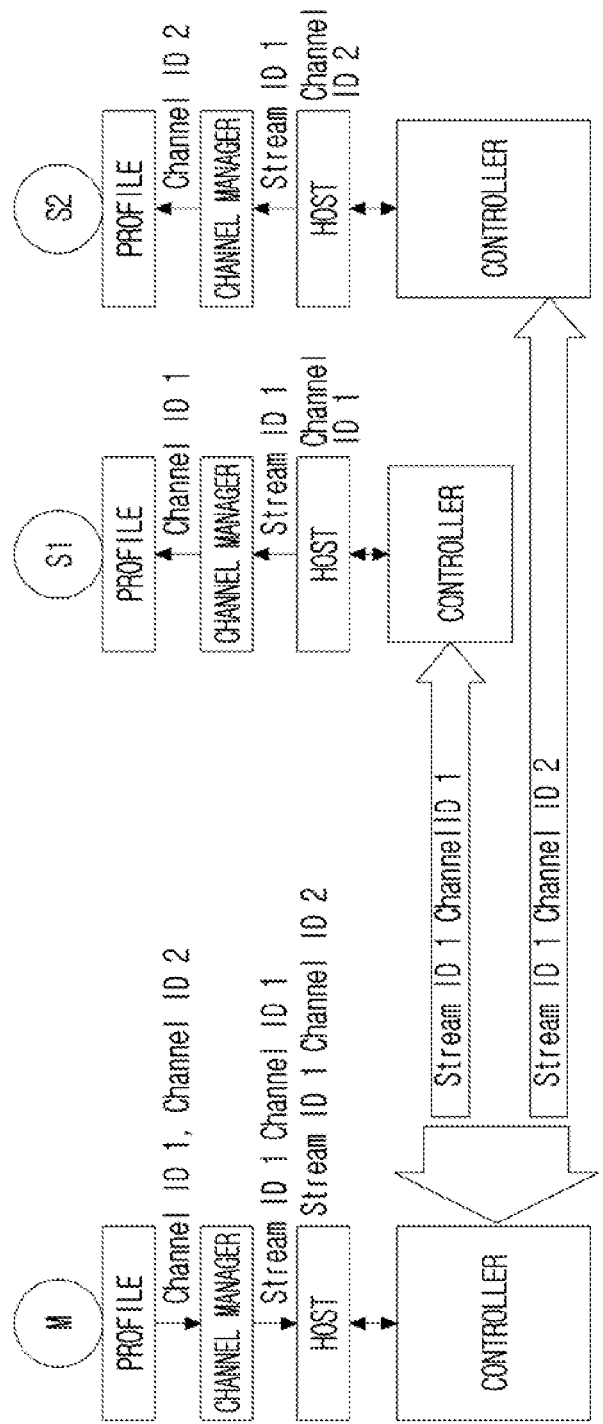
FIG. 8 and FIG. 9 are diagrams for describing the operation of the ICL type and the INCL type to which the present disclosure is applicable.
Figure 9:
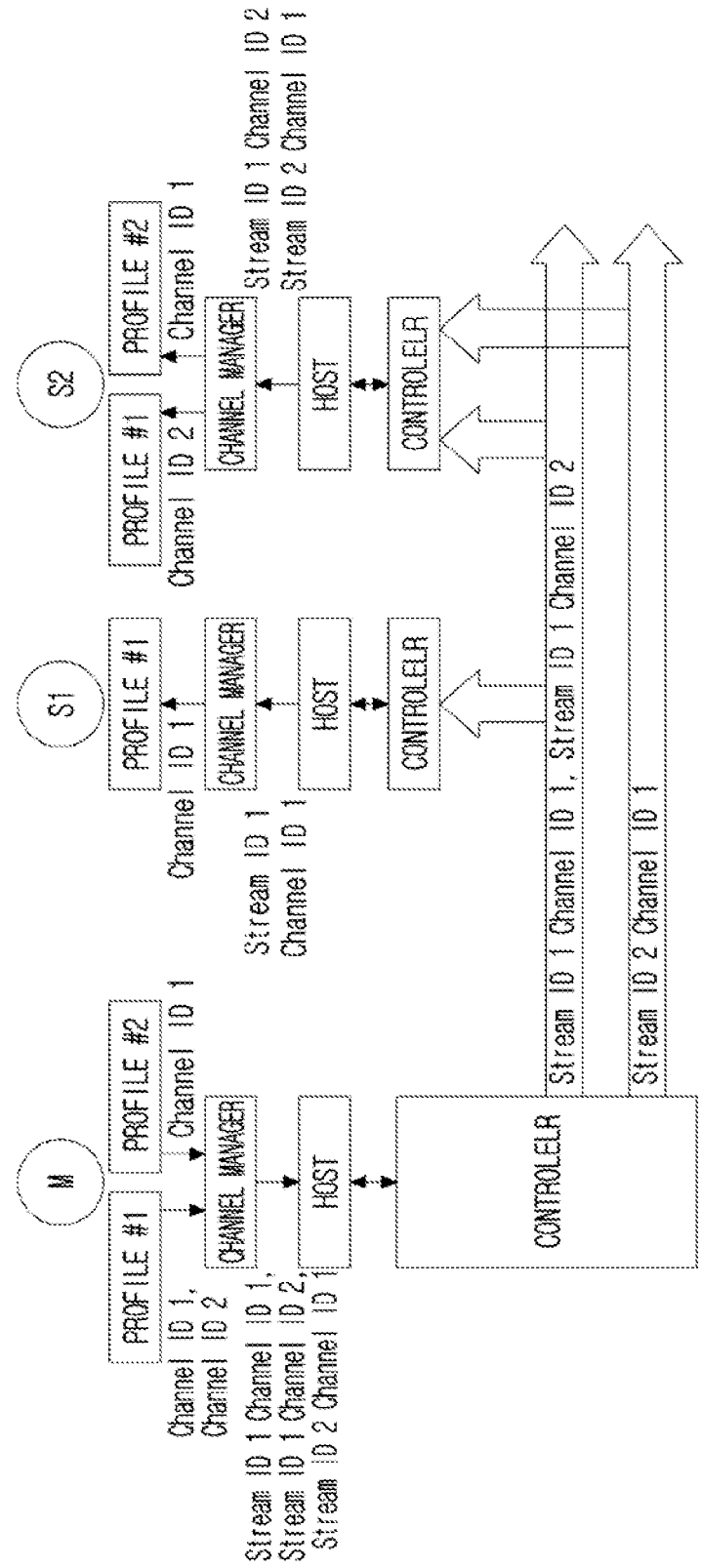

FIG. 8 and FIG. 9 are diagrams for describing the operation of a ICL type and a INCL type to which the present disclosure is applicable.

In BLE, a channel for audio transmission may be classified into an ICL type and an INCL type. Both the ICL channel and the INCL channel may transmit audio data to multiple devices and/or multiple profiles using a stream ID and a channel ID. According to the ICL type and the INCL type, it may be determined what operation is to be performed on the BLE channel for audio data transmission.

ICL channels correspond to a connection-based use case that supports unidirectional or bidirectional communication through a point-to-point physical link between one source device and one sink device. In addition, INCL channels correspond to a broadcast use case that supports only unidirectional communication through a point-to-multipoint physical link between one source device and one or more sink devices.

The protocol stack of the device may include a profile layer, a channel manager layer, a host layer, and a controller layer in order from an upper layer to a lower layer. Data may be transferred between the profile layer and the channel manager layer in units of channels, and data may be transferred between the channel manager layer and the host layer in units of streams.

Referring to FIG. 8, in case of the ICL type, a connection between a master (M) and the first slave S1 and a connection between the master M and the second slave S2. In this case, it is possible to divide two channels included in one stream by a channel identifier and transmit to the two slaves. That is, channel ID 1 may be allocated to the S1 and channel ID 2 may be allocated to the S2. Both the channel ID 1 and the Channel ID 2 may be transmitted through the same stream ID 1. In addition, since bidirectional communication is possible based on the connection, the slaves may provide feedback information to the master M. For example, when S1 is a wireless earphone mounted on the right ear and S2 is a wireless earphone mounted on the left ear, it is possible to listen to music transmitted by the master M in stereo through S1 and S2.

Referring to FIG. 9, in the case of the INCL type, there is no connection between the master M and the slaves (S1, S2), and the slaves may synchronize with a INCL stream offset, an event, a timing of the sub-event based on the synchronization information advertised by the master and may receive broadcast audio data. In addition, the master M may include two profiles (profile #1 and profile #2). The first slave S1 may include the profile #1, and the second slave S2 may include the profile #1 and the profile #2. In Profile #1, the channel ID 1 and the channel ID 2 may be broadcast from the master M through one stream, Stream ID 1, and it is similar to FIG. 8 that the slaves S1 and S2 respectively receive the channel ID 1 and the channel ID in Profile #1. Additionally, in profile #2, the channel ID 1 may be broadcast from the master M through Stream ID 2, and the second slave S2 may receive Channel ID 1 in profile #2.

Figure 10:
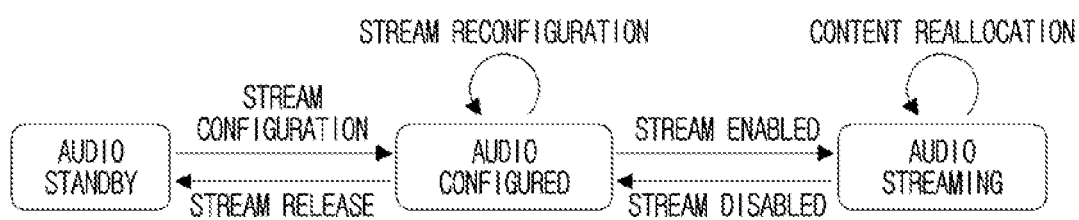
FIG. 10 is a diagram illustrating a broadcast audio stream state machine to which the present disclosure is applicable.

FIG. 10 is a diagram illustrating a broadcast audio stream state machine to which the present disclosure is applicable.

The control of the broadcast audio stream may be described as a broadcast audio stream state machine and state transition at the broadcast transmitting end.

The broadcast audio stream state machine may allow a broadcast transmitter to communicate with one or more broadcast receivers (or broadcast discovery clients) in a one-way manner without a connection or not with a broadcast receiver (or broadcast discovery client). The broadcast transmitter may communicate using a broadcast audio advertisement in the form of a Broadcast Audio Source Session (BASS). A broadcast audio stream may be transmitted by a broadcast transmitter.

The AUDIO STANDBY state means a state in which a broadcast audio stream is not transmitted.

The AUDIO CONFIGURED state means a state in which a broadcast receiver (or a broadcast discovery initiator) starts advertising information for detecting an audio stream through a periodic advertising event. The periodic advertising event may include delivering advertisement metadata, stream configuration, synchronization information, and the like. In this state, no audio data packet is transmitted from the broadcast transmitter.

The AUDIO STREAMING state means a state in which a broadcast audio stream is enabled in a broadcast transmitter and an audio data packet may be transmitted. The broadcast transmitter may continuously perform metadata advertising through periodic advertising while transmitting the broadcast audio stream. If a stream is configured in the AUDIO STANDBY state, it may transition to the AUDIO CONFIGURED state, and if the stream is released in the AUDIO CONFIGURED state, it may transition to the AUDIO STANDBY state. If a stream is enabled in the AUDIO CONFIGURED state, it may transition to the AUDIO STREAMING state, and if the stream is disabled in the AUDIO STREAMING state, it may transition to the AUDIO CONFIGURED state. If a stream reconfiguration occurs in the AUDIO CONFIGURED state, it may transition to the AUDIO CONFIGURED state. When content reassignment occurs in the AUDIO STREAMING state, it may transition to the AUDIO STREAMING state.

Figure 11:
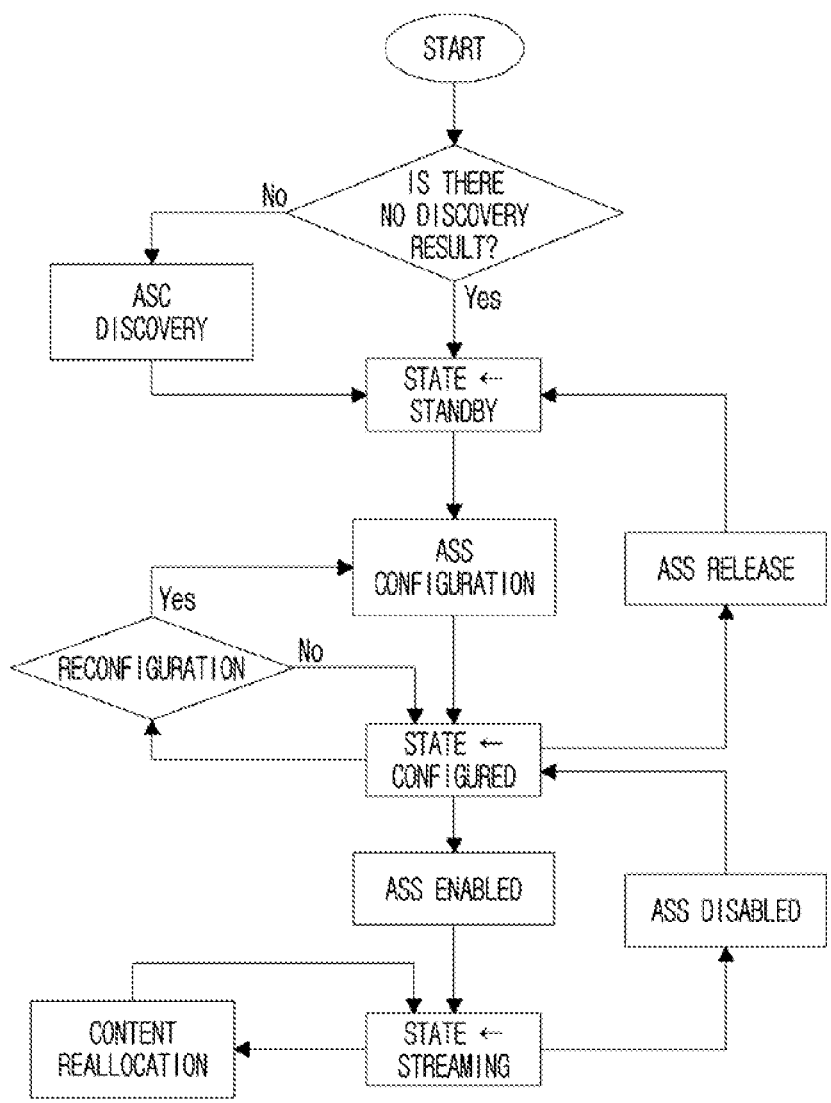
FIG. 11 is a diagram illustrating an audio setup procedure to which the present disclosure is applicable.

FIG. 11 is a diagram illustrating an audio setup procedure to which the present disclosure is applicable.

When there is no discovery result (that is, zero discovery), the AUDIO STANDBY state may be transitioned, and if there is a discovery result, discovery for Audio Stream Capability (ASC) may be performed and transition to the AUDIO STANDBY state.

When an ASS (Audio Stream Session) configuration occurs, it may transition to the AUDIO CONFIGURED state. If ASS is released in the AUDIO CONFIGURED state, it may transition to the AUDIO STANDBY state. When reconfiguration occurs in the AUDIO CONFIGURED state, it may transition to the AUDIO CONFIGURED state through the ASS configuration.

When ASS is activated, it may transition to AUDIO STREAMING state. If ASS deactivation occurs in the AUDIO STREAMING state, it may transition to the AUDIO CONFIGURED state. If content reassignment occurs in the AUDIO STREAMING state, it may transition to the AUDIO STREAMING state.

Figure 12:
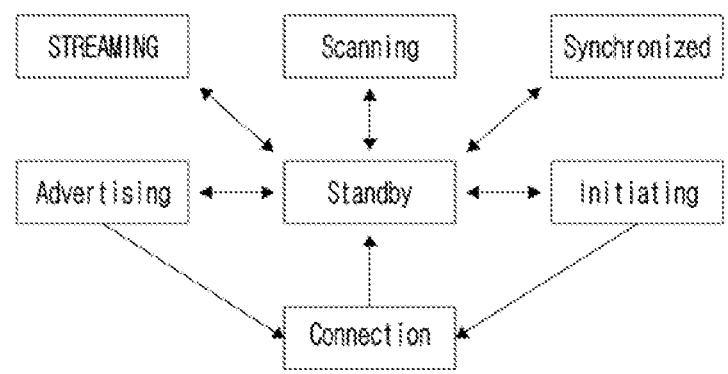
FIG. 12 is a diagram illustrating a link layer state machine to which the present disclosure is applicable.

FIG. 12 is a diagram illustrating a link layer state machine to which the present disclosure is applicable.

The operation of the link layer LL may be expressed as (in terms of an isochronous channel) Standby state, Advertising state, Scanning state, Initiating state, Connection state, Synchronized (synchronization) state, and Streaming (Isochronous Broadcasting) state.

The Standby state corresponds to a standby state before transitioning to another state.

In the Advertising state, the LL may operate as a advertiser transmitting an advertising packet. When a connection is established in the advertising state, the device may operate as a slave.

In the Initiating state, the LL may act as an initiator that listens for packets from other advertisers and initiates a connection in response to the packets. When a connection is established in the initiating state, the device may operate as a master.

In the Scanning state, the LL may act as a scanner that listens for packets from other advertisers and requests additional information.

The synchronized state may refer to a state in which an audio stream may be received or received in synchronization with another device.

The streaming state may refer to a state in which an audio stream is transmitted to another synchronized device.

Figure 13:
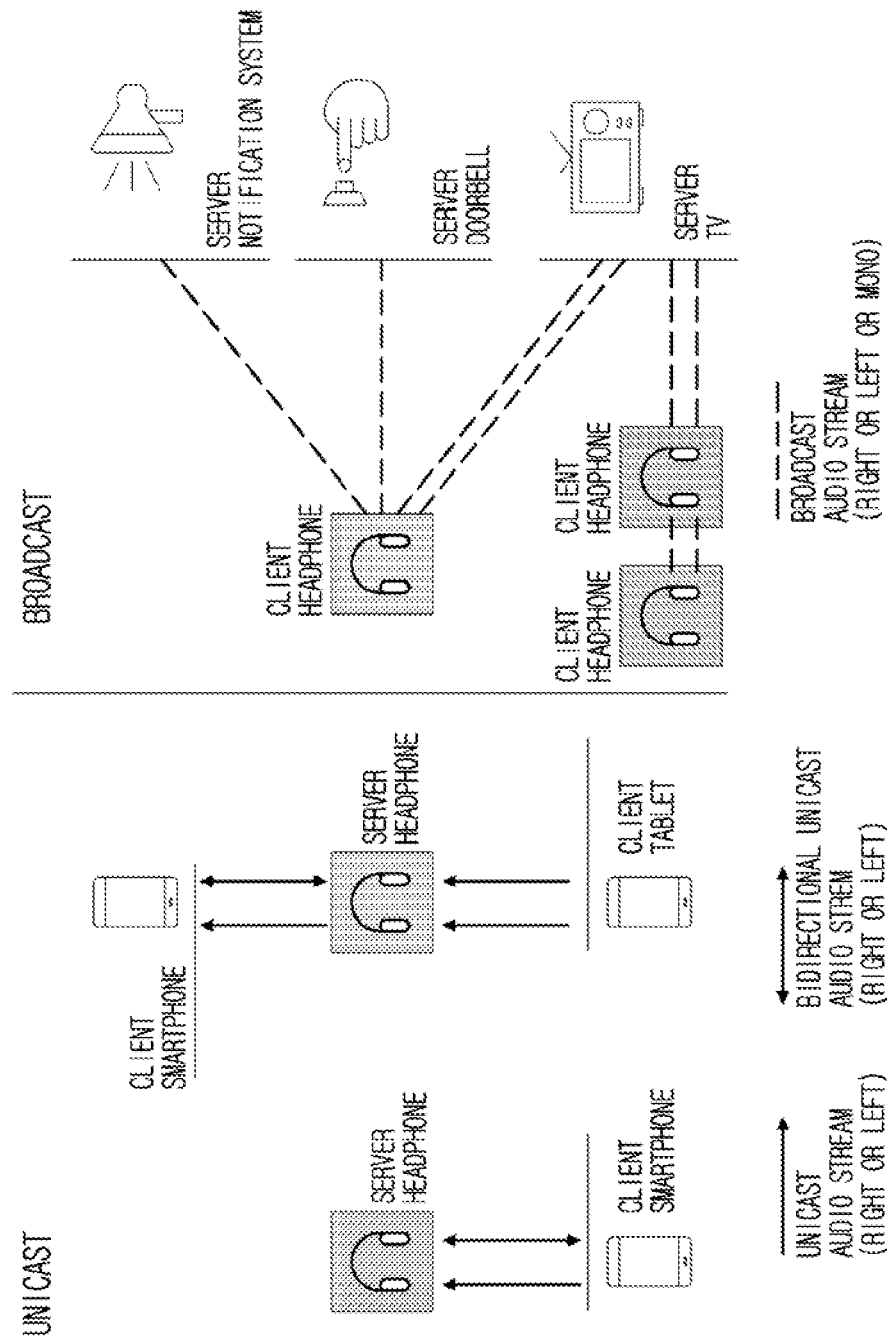
FIG. 13 is a diagram illustrating an example of an audio topology to which the present disclosure is applicable.

FIG. 13 is a diagram illustrating an audio topology to which the present disclosure is applicable.

In the case of unicast, unidirectional or bidirectional audio streams may be supported. Unicast audio data transmission/reception based on a connection between a headset and a smartphone may be performed, and the unicast audio data transmission/reception based on a connection between a headset and a smartphone and a connection between the headset and a tablet may be performed. In this case, the server of the unicast audio service may be a headphone, and the client may be a smartphone or tablet. Also, headphones may correspond to an audio sink, and a smartphone or tablet may correspond to an audio source.

In the case of broadcast, a notification system, a doorbell, a TV, etc. may transmit audio data in a broadcast manner, and one or more devices may receive the broadcast audio data. In this case, the server of the broadcast audio service may be a notification system, a doorbell, a TV, or the like, and the client may be a headphone. Also, the headphones may correspond to an audio sink, and a notification system, a doorbell, and a TV may correspond to an audio source.

Figure 14:
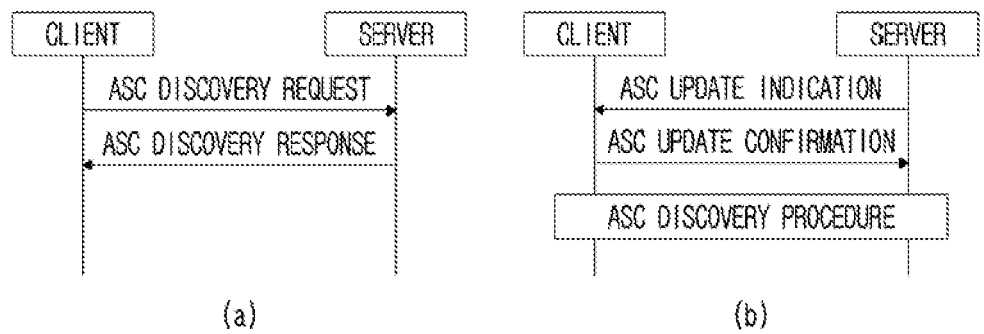
FIG. 14 to FIG. 16 are diagrams illustrating a message exchange process between a server and a client to which the present disclosure is applicable.
Figure 15:
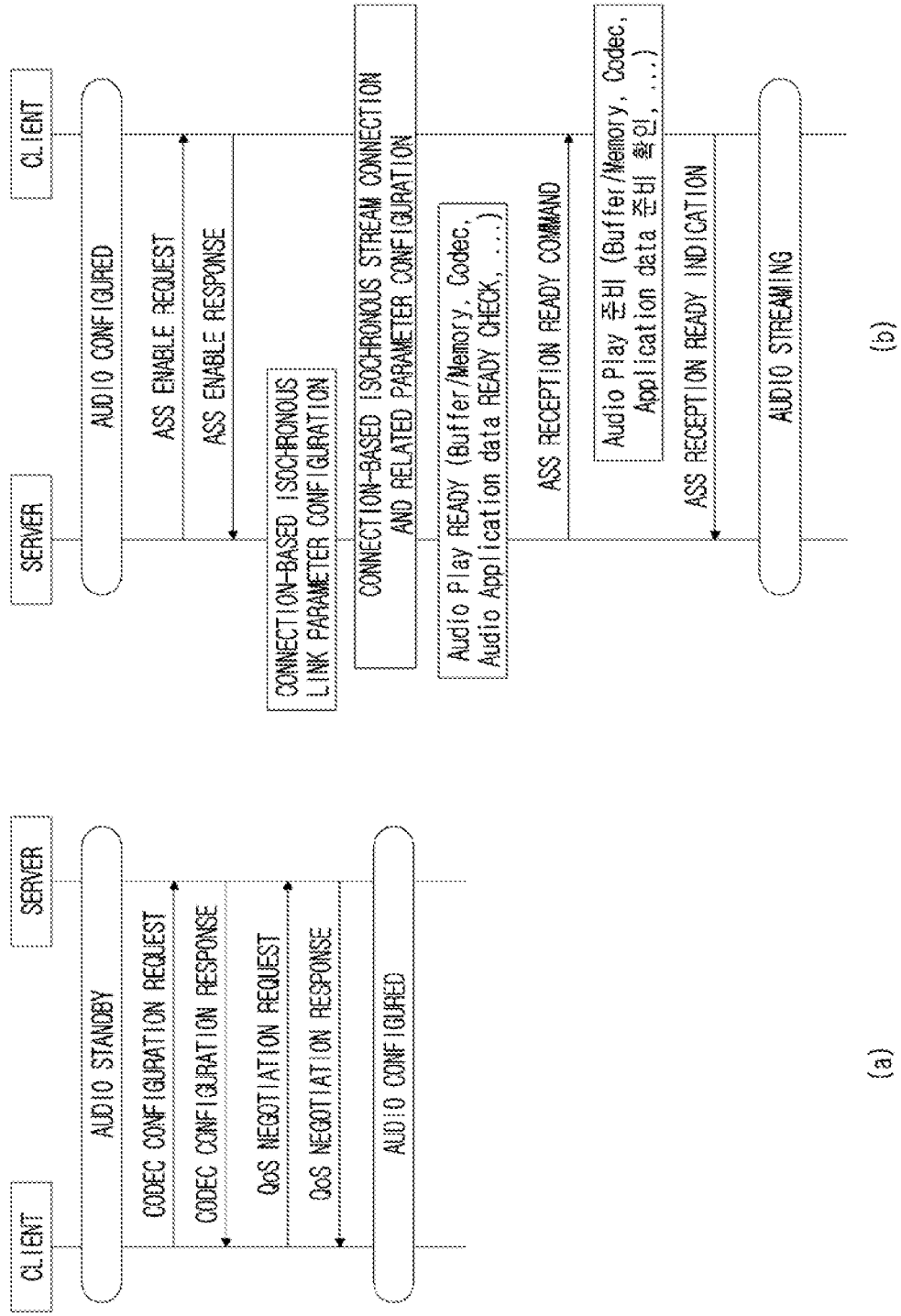
Figure 16:
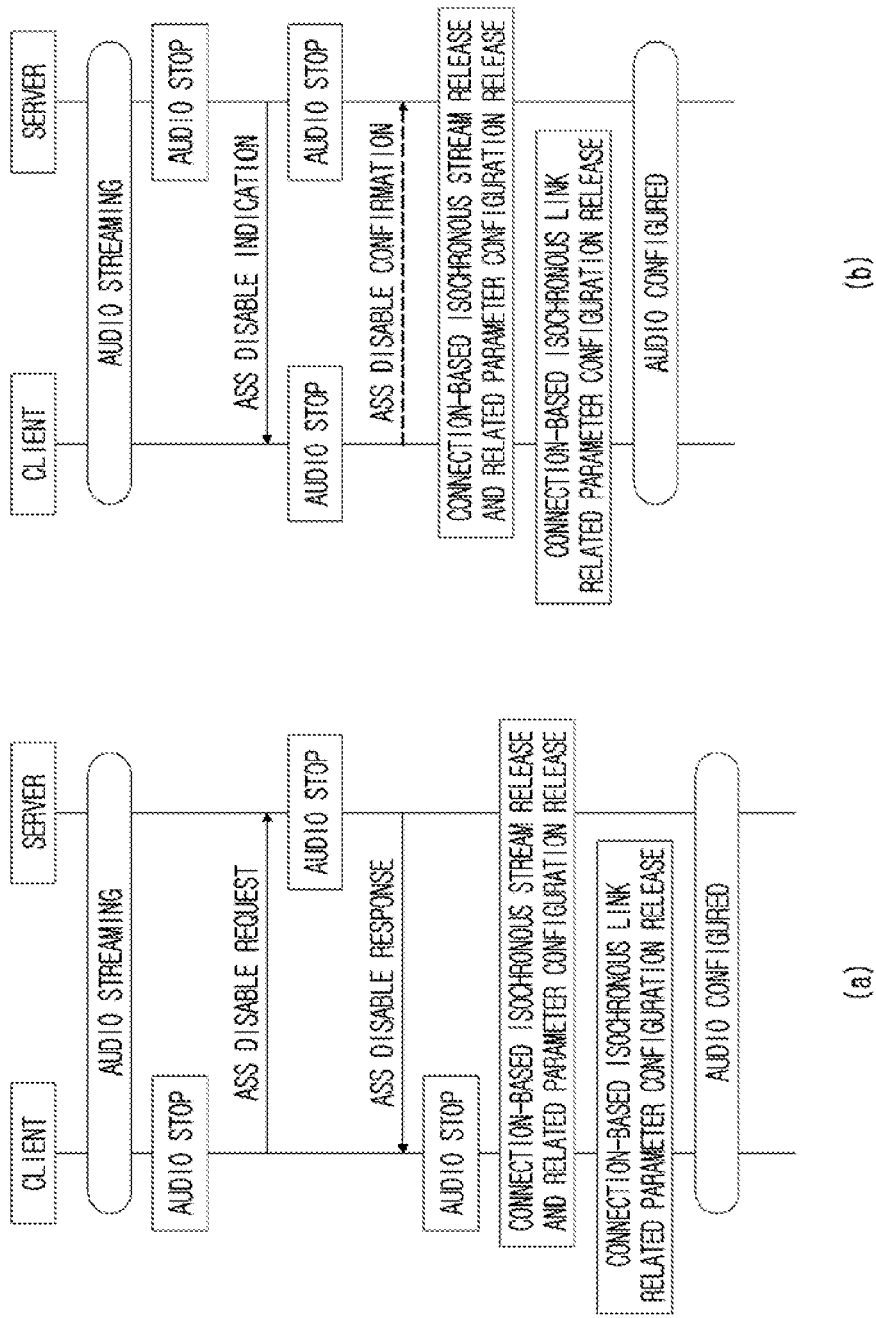

FIG. 14 to FIG. 16 are diagrams illustrating a message exchange procedure between a server and a client to which the present disclosure is applicable.

In the example of FIG. 14 to FIG. 16, the client may be an audio source and the server may be an audio sink. Or, the client may be an audio sink and the server may be an audio source.

FIG. 14 exemplarily illustrates an audio session capability (ASC) discovery procedure and an ASC update procedure.

In the audio session capability discovery procedure of FIG. 14(a), the client may request capability discovery by transmitting an ASC discovery request message to the server, and in response to that, the server may transmit detailed information of the capability by transmitting an ASC discovery response message to the client.

In the audio session capability update procedure of FIG. 14(b), the server may transmit an ASC update indication message to the client to inform that the capability update has occurred, and the client may notify the server to perform a capability update by transmitting an ASC update confirmation message. Subsequently, an audio session capability discovery procedure or an ASC discovery procedure may be performed.

The format of the message used in the example of FIG. 14 may be defined as shown in Table 1 below.

TABLE 1

| ASC_DISCOVERY REQUEST |
| --- |
| Direction |
| ASC_DISCOVERY RESPONSE |
| Sink Locations: Bitmap |
| Source Locations: Bitmap |
| Number of ASC Records |
| Direction |
| Codec ID |
| Sampling Frequency |
| Codec Specific |
| Content Protection Type |
| Content Protection type Specific |

The ASC update indication message and the ASC update confirmation message may include information indicating that ASC discovery is required and confirmation information therefor, respectively.

FIG. 15 exemplarily illustrate a unicast audio stream configuration procedure and an unicast audio stream establishment procedure.

In the unicast audio stream configuration procedure of FIG. 15 (a), the client, in the AUDIO STANDBY state, may transmit a Codec configuration request message to the server to inform the server of the codec requesting configuration, and the like. In response, the server may transmit a codec configuration response message to the client to inform the server of QoS and rendering delay values supported by the server. In addition, the client may transmit a QoS negotiation request message to the server to specify a specific audio stream session (ASS), an audio group, and an audio stream to inform the client of QoS and rendering delay values supported by the client. In response, the server may transmit a QoS negotiation response message to the client. Accordingly, bandwidth (BW), bitrate, etc. may be determined by negotiation between the client and the server, and the client and the server may transition to a CONFIGURED state.

In the unicast audio stream establishment procedure of FIG. 15 (b), the client may transmit an ASS enable request message to the server in the AUDIO CONFIGURED state to inform information on the ASS requesting activation. In response, the server may transmit an ASS enable response message to the client to inform about which ASS to activate. Configuration for connection-based isochronous link parameters may be performed at the client, and CBIS may be established by the client and the server configuring the connection-based isochronous stream connection and related parameters. If the client is the audio sink and the server is the audio source, the server may prepare to play audio data and transmit an ASS Rx ready indication message to the client, and the client may prepare to provide audio data after receiving the ASS reception ready indication notification message. Accordingly, the client and the server may transition to the AUDIO STREAMING state.

The format of the message used in the example of FIG. 15 may be defined as shown in table 2 below.

TABLE 2

| CODEC CONFIGURATION REQUEST |
| --- |
| ASS ID |
| ASA ID |
| Direction |
| Codec ID |
| Sampling Frequency |
| Codec Specific |
| CODEC CONFIGURATION RESPONSE |
| ASS ID |
| Server Supported QoS (Interleaved, Framed, Transport Latency) |
| Presentation delay |
| QOS NEGOTIATION REQUEST |
| ASS ID |
| CBISS ID |
| CBIS ID |
| Client QoS (Transport Latency) |
| Rendering Delay |
| QOS NEGOTIATION RESPONSE |
| ASS ID |
| ASS ENABLE REQUEST/ASS ENABLE RESPONSE |
| Number of ASS ID |
| ASS ID |
| ASA ID |
| Content Type |
| ASS RX READY COMMAND/ASS RX READY NOTIFICATION |
| Number of ASS ID |
| ASS ID |

FIG. 16 exemplarily illustrates a procedure for disabling an audio stream by a client and a procedure for disabling an audio stream by a server.

In the procedure of the client disable audio streams in FIG. 16(a), if the client is an audio source and the server is an audio sink, when the client decides to stop the audio in the AUDIO STREAMING state, an ASS disable request message may be transmitted to the server. Accordingly, the server may stop streaming audio data and transmit an ASS disable response message to the client. Upon receiving this, the client may stop audio data encoding and audio application operation.

Alternatively, if the client is an audio sink and the server is an audio source, the client may stop audio data streaming and transmit ASS disable request message to the client. Accordingly, the server may stop audio data encoding and audio application operation and transmit an ASS disable response message to the client.

After that, the client and the server may perform connection-based isochronous stream release and related parameter setting release. Here, in preparation for reconnection between the client and the server, device information may be stored in the client and/or the server together with an isochronous stream connection related parameter. Accordingly, the client may release the connection-based isochronous link related parameter setting. Accordingly, the client and the server may transition to the AUDIO CONFIGURED state.

In the example of FIG. 16(b), in the procedure of disabling audio streams by the server, if the server is an audio source and the client is an audio sink, when the server decides to stop audio in the AUDIO STREAMING state, an ASS disable indication message may be transmitted to the client. Accordingly, the client may stop streaming audio data and may or may not transmit an ASS disable confirmation message to the server. The server may stop encoding audio data and audio application operation with or without receiving an ASS deactivation response.

Alternatively, if the server is an audio sink and the client is an audio source, the server may stop audio data streaming and transmit an ASS disable indication message to the client. Accordingly, the client may stop the audio data encoding and audio application operation, and may or may not transmit an ASS disable confirmation message to the server.

After that, the client and the server may perform connection-based isochronous stream release and related parameter configuration release. Here, in preparation for reconnection between the client and the server, device information may be stored in the client and/or the server together with an isochronous stream connection related parameter. Accordingly, the client may release the connection-based isochronous link related parameter configuration. Accordingly, the client and the server may transition to the AUDIO CONFIGURED state.

The format of the message used in the example of FIG. 16 may be defined as shown in table 3 below.

TABLE 3

ASS DISABLE REQUEST/ASS DISABLE RESPONSE/ASS DISABLE INDICATION
Number of ASS ID
ASS ID
(No Contents)

Table 4 below exemplarily shows content reallocation request/response, ASS release request/response, general advertisement, and directed advertisement message formats.

TABLE 4

Figure 17:
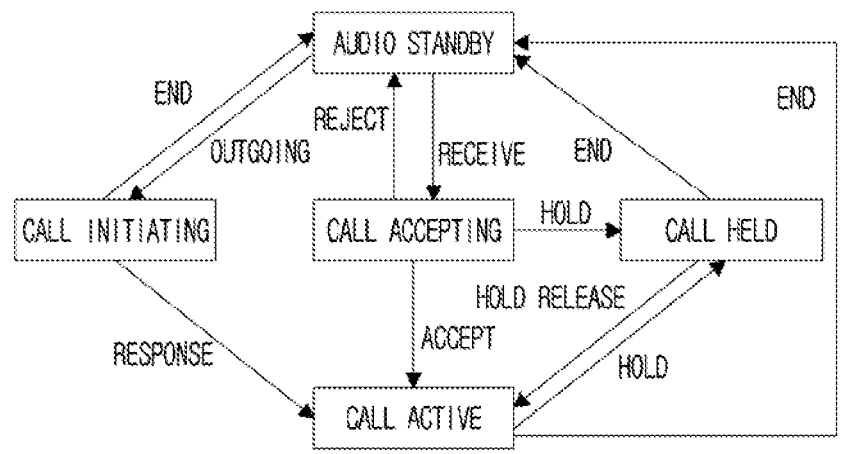
FIG. 17 is a diagram illustrating a state machine for a call service to which the present disclosure is applicable.

REASSIGN CONTENT REQUEST/REASSIGN CONTENT RESPONSE
Number of ASS ID
ASS ID
ASA ID
Content Type
ASS RELEASE REQUEST/ASS RELEASE RESPONSE
ASS ID
GENERAL ADVERTISEMENT
DIRECTED ADVERTISEMENT
Content Type
Meta data FIG. 17 is a diagram illustrating a state machine for a call service to which the present disclosure is applicable.

When a call is received in the AUDIO STANDBY state, it may transition to the CALL ACCEPTING state. When a call is accepted in the CALL ACCEPTING state, it may transition to the CALL ACTIVE state. When a call is rejected in the CALL ACCEPTING state, it may transition to the AUDIO STANDBY state. In the case of hold in which a call cannot be received in the CALL ACCEPTING state, it may transition to the CALL HELD state, and may transition to the CALL ACTIVE state when the hold is released in the CALL HELD state. When the CALL HELD state or the CALL ACTIVE state is terminated, it may transition to the AUDIO STANDBY state.

Also, When a call is outgoing in the AUDIO STANDBY state, it may transition to the CALL INITIATING state. When it answers a call from a remote location or the other party in the CALL INITIATING state, it may transition to the CALL ACTIVE state. When it ends in the CALL INITIATING state, it may transition to the AUDIO STANDBY state.

In such a call service state machine, audio data that needs to be delivered to the headset in the AUDIO STANDBY state may occur. For example, audio data may be transmitted to the headset when a response when a phone number is dialed is notified by sound.

Alternatively, information definitively indicating various wireless access technology (e.g., 2G, 3G, 4G, 5G, Wi-Fi, GSM, CDMA, WCDMA, etc.) related to the call service. For example, For example, a bearer technology field having a size of 1 octet may be defined. This may be related to the aforementioned call bearer service.

In the case of multiway calling, a plurality of lines may exist, and a state machine as shown in FIG. 17 may be maintained for each line. For example, when the second line transitions from the AUDIO STANDBY state to the CALL ACCEPTING state while the first line is in the CALL ACTIVE state, the first or the second line may transition to the CALL HELD state according to the user's control.

Hereinafter, logical links of Bluetooth system and logical transports will be described.

A variety of logical links may be used to support different application data transfer requirements. Each logical link is associated with a logical transport, which may have various characteristics. These characteristics may include flow control, acknowledgment/repeat mechanisms, sequence numbering and scheduling operations, and the like. A logical transport may carry various types of logical links depending on its type. A plurality of logical links may be multiplexed into the same single logical transport. A logical transport may be carried by a physical link on a particular channel.

Logical transport identification and real-time (link control) signaling may be included in the packet header, and specific logical link identification may be included in the header of the payload.

Table 5 below exemplarily illustrates logical transport types, supported logical link types, supported physical link and physical channel types, and descriptions of logical transports.

TABLE 5

| Logical transport | Links supported | Supported by | Bearer | Overview |
| --- | --- | --- | --- | --- |
| Connection based | Stream (framed or | LE isochronous physical link | LE | Unidirectional or bidirectional |

TABLE 5-continued

| Logical transport | Links supported | Supported by | Bearer | Overview |
|---|---|---|---|---|
| Isochronous Stream | unframed) LE-S or LE-F | | | transport in a point-to-point connection for transferring isochronous data. |
| Broadcast Isochronous Stream | Stream (framed or unframed) LE-S (or LE-F) and Control (LEB-C) | LE isochronous physical link | LE | Unidirectional transport for broadcasting data in a point to multipoint configuration and unidirectional transport for controlling the broadcast data |

Figure 18:
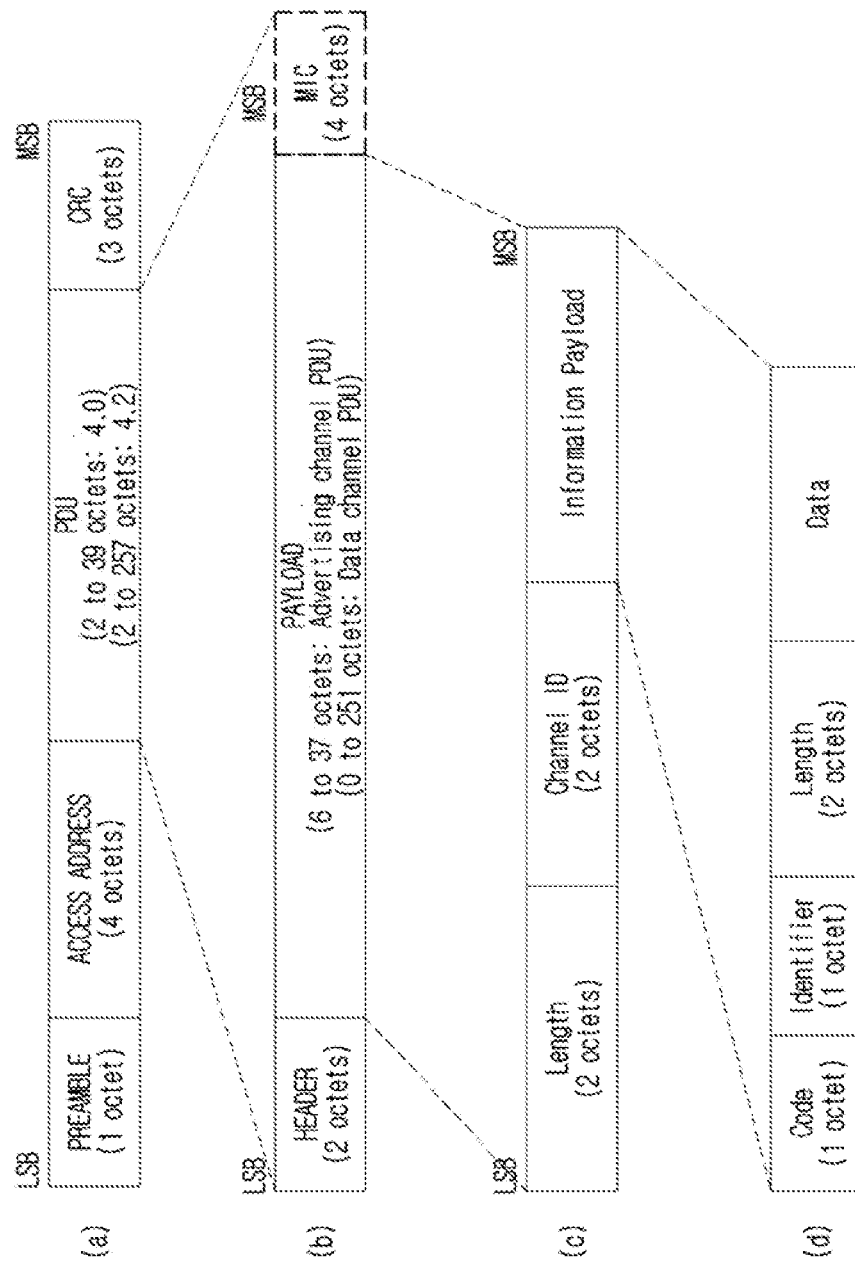
FIG. 18 is a diagram illustrating a packet format for each layer to which the present disclosure is applicable.

FIG. 18 is a diagram illustrating a packet format for each layer to which the present disclosure is applicable.

FIG. 18(a) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 18(b) illustrates an exemplary format of the PDU of FIG. 18(a). PDU may be defined in two types, one is a data channel PDU (Data channel PDU), the other is an advertising channel PDU (Advertising channel PDU). The data channel PDU will be described in detail with reference to FIG. 19, and the advertising channel PDU will be described in detail with reference to FIG. 20.

FIG. 18(c) illustrates an example of an L2CAP PDU format, which may correspond to an exemplary format of the payload field of FIG. 18(b). The L2CAP PDU may include a Length, a Channel ID, and an Information Payload field. The length field may indicate the size of the information payload, and the information payload field may include higher layer data. The channel identifier field may indicate which upper layer data the information payload field includes. For example, if the value of the channel identifier field is 0x0004, it may indicate ATT (ATTribute protocol), if the value of the channel identifier field is 0x0004, it may indicate SMP (Security Manager Protocol), or another channel identifier indicating a different type of upper layer or middleware Values may be defined and used.

When the L2CAP packet of FIG. 18(c) is an L2CAP PDU (i.e., a control frame) transmitted on a signaling channel, the information payload field of FIG. 18(c) may be configured as shown in FIG. 18(d). The information payload field may include a code (Code), an identifier (Identifier), a length (Length) and data (Data) fields. For example, the code field may indicate the type of the L2CAP signaling message. The identifier field may include a value that matches the request and the response. The length field may indicate the size of the data field. Data fields may contain attributes. An attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

Figure 19:
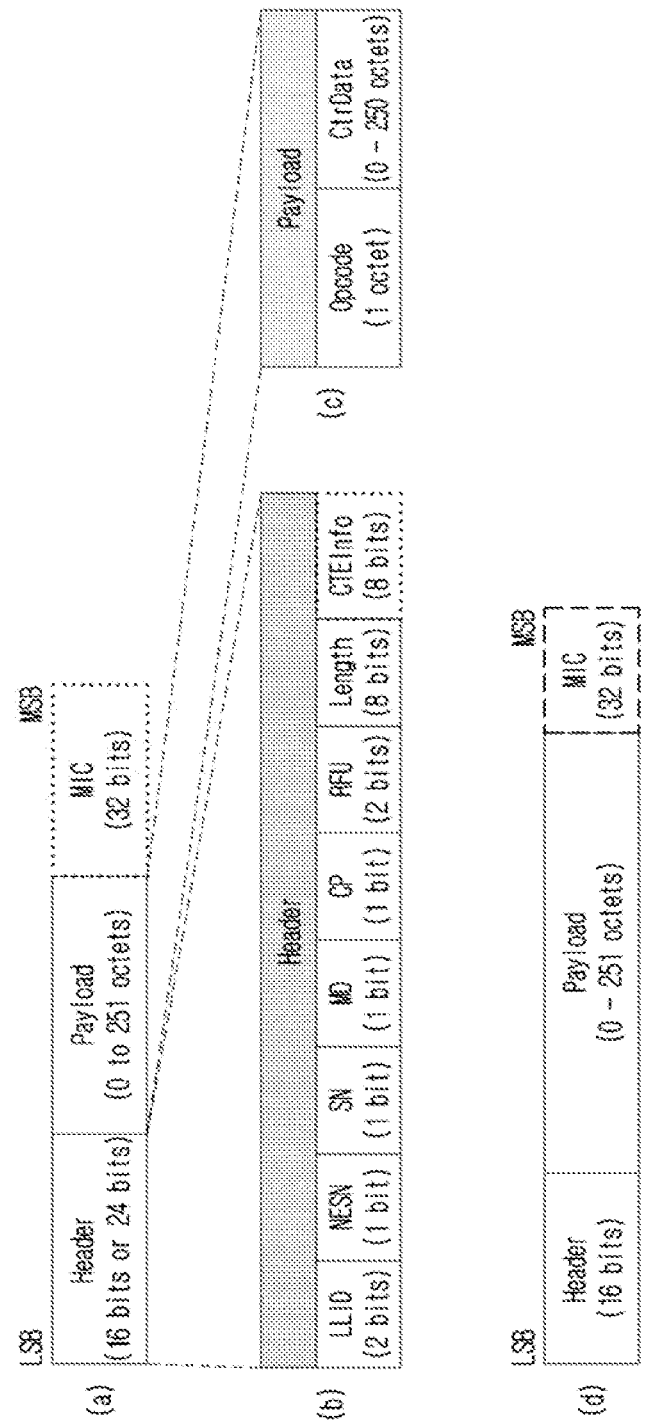
FIG. 19 is a diagram illustrating examples of a data unit format to which the present disclosure is applicable.

FIG. 19 is a diagram illustrating examples of a data unit format to which the present disclosure is applicable.

FIG. 19(a) illustrates an exemplary format of a data physical channel PDU (Protocol Data Unit). The data channel PDU may be used to transmit a packet on the data physical channel (e.g., channel number 0 to 36). The data physical channel PDU includes a 16 or 24 bit length header and a variable size (e.g., 0 to 251 octet size) payload, and may further include a Message Integrity Check (MIC) field. For example, the MIC field may be included in the case of an encrypted link layer connection in which the payload field size is not 0.

As shown in FIG. 19(b), the header fields may include LLID (Logical Link Identifier), NESN (Next Expected Sequence Number), SN (Sequence Number), MD (More Data), CP (CTEInfo Present), RFU (Reserved). for Future Use). The RFU corresponds to a part reserved for future use when necessary, and its value may be usually filled with 0. Also, according to the value of the CP field, the header field may further include a Constant Tone Extension Information (CTEInfo) subfield. In addition, the Length field may indicate the size of the payload, and when the MIC is included, it may indicate the length of the payload and the MIC.

FIG. 19(c) illustrates an exemplary format of an LL Control PDU. The LL Control PDU may correspond to a data physical channel PDU used to control link layer connection. The LL Control PDU may have a fixed value according to an operation code (Opcode). The Opcode field may indicate the type of the LL Control PDU. The control data (CtrData) field may have various formats and lengths specified by the Opcode.

For example, the Opcode of the LL Control PDU may have a value (e.g., 0x1F, 0x20, 0x21, 0x22, . . . ) indicating one of LL_CBIS_REQ, LL_CBIS_RSP, LL_CBIS_IND, LL_CBIS_TERMINATE_IND, LL_CBIS_SDU_CONFIG_REQ, and LL_CBIS_SDU_CONFIG_RSP.

When the opcode indicates LL_CBIS_REQ, the CtrData field may include information necessary for a CBIS request together with CBISS identification information and CBIS identification information. Similarly, in each case where the Opcode indicates one of LL_CBIS_RSP, LL_CBIS_IND, LL_CBIS_TERMINATE_IND, LL_CBIS_SDU_CONFIG_REQ, LL_CBIS_SDU_CONFIG_RSP, the CtrData may include information required for a CBIS response, a CBIS indication, a CBIS termination indication, a CBIS Service Data Unit (SDU) setup request, and a CBIS SDU setup response.

FIG. 19(d) illustrates an example of audio data PDU format.

Audio data PDU may be CBIS PDU or broadcast isochronous PDU. When used in a CBIS stream, the audio data PDU may be defined as CBIS PDU. When used in a broadcast isochronous PDU, the audio data PDU may be defined as broadcast isochronous PDU.

The audio data PDU may include a 16-bit length header field and a variable length payload field. Also, the audio data PDU may further include a MIC field.

In the case of a CBIS PDU, the format of the header field may include 2-bit LLID, 1-bit NESN, 1-bit SN, 1-bit Close Isochronous Event (CIE), 1-bit RFU, 1-bit Null PDU Indicator (NPI), 1-bit RFU, 9-bit Length subfield.

In the case of broadcast isochronous PDU, the format of the header field may include 2-bit LLID, 3-bit Control Subevent Sequence Number (CSSN), 1-bit Control Subevent Transmission Number (CSTF), 2-bit RFU, and 8-bit Length subfield.

The payload field of audio data PDU may include audio data.

Figure 20:
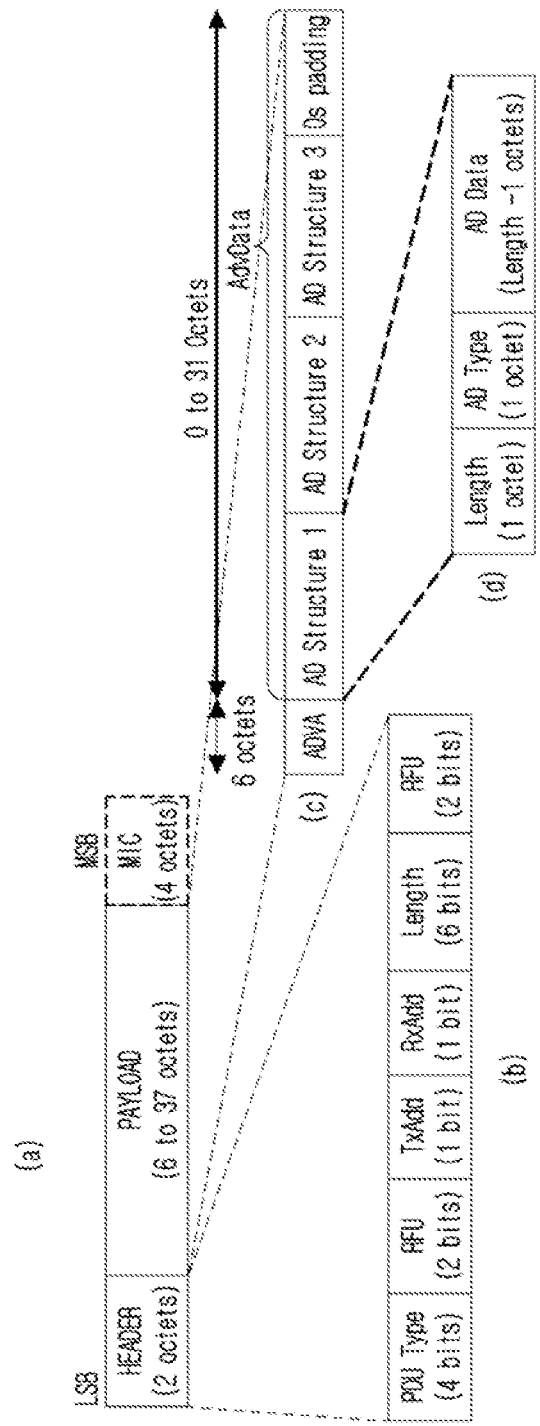
FIG. 20 is a diagram illustrating examples of an advertisement unit format to which the present disclosure is applicable.

FIG. 20 is a diagram illustrating examples of an advertisement unit format to which the present disclosure is applicable.

FIG. 20(a) shows an exemplary format of an Advertising Physical Channel PDU (Protocol Data Unit). The advertising channel PDU may be used to transmit packets on an advertising physical channel (e.g., channel numbers 37, 38, 39). The advertising channel PDU may consist of a header of 2 octets and a payload of 6 to 37 octets.

FIG. 20(b) shows an exemplary format of a header of an advertising channel PDU. The header may include a PDU type, a Reserved for Future Use (RFU), a transmission address (TxAdd), a reception address (RxAdd), a length (Length), and an RFU field. The length field of the header may indicate the size of the payload.

FIG. 20(c) shows an exemplary format of a payload of an advertising channel PDU. The payload may include an Advertiser Address (AdvA) field with a length of 6 octets and an AdvData field with a length of 0 to 31 octets. The AdvA field may include a public address or a random address of the advertiser. The AdvData field may include zero or more advertising data (AD) structures, and padding if necessary.

FIG. 20(d) shows a format of one AD structure. The AD structure may include three fields. A length field may indicate a length of a AD Data field. That is, a value obtained by subtracting 1 from the value indicated by the length field may correspond to the length of the AD Data field. The AD Type field may indicate a type of data included in the AD Data field. The AD Data field may include advertising data provided from a host of an advertiser.

Hereinafter, embodiments of a broadcast discovery according to the present disclosure will be described.

In a broadcast discovery service (BDS), the second device may discover a broadcast session source (BSS) or a broadcast source, and may provide a discovery result to the first device. That is, the second device may discover the BSS on behalf of the first device. This does not limit the broadcast discovery of the first device, and the second device may assist or perform part or all of the broadcast discovery of the first device on behalf of it. That is, part or all of the discovery burden of the first device may be offloaded to the second device. Broadcast discovery may also be referred to as broadcast scanning, and the above-described operation may be referred to as discovery offloading or scan offloading.

In addition, the second device may determine whether to perform discovery on behalf of the first device according to a request of the first device or a state notification. Alternatively, the second device may inform the first device that discovery may be performed on behalf of the first device, and whether the second device performs discovery may be determined according to the acknowledgment of the first device. For example, the second device may inform the first device that the second device performs or does not perform remote discovery or remote scanning on behalf of the first device.

The first device may select one or more BSSs based on discovery-related information provided from the second device, and may receive broadcast audio from the corresponding BSSs through a procedure such as synchronization with the selected BSS.

The second device may simply transmit a discovery result information to the first device. In this case, the first device may select one or more specific BSSs from among a plurality of BSSs included in the discovery result information.

Alternatively, the second device may transmit priority information to the first device by applying a priority to a plurality of BSSs included in the discovery result. Accordingly, the first device may select one or more BSSs in the order of the priority.

Alternatively, the second device may select one or more specific BSSs from among a plurality of BSSs included in the discovery result and transmit the selection result information to the first device. Accordingly, the first device may select one or more BSSs selected by the second device.

For example, the second device may provide information on a specific BSS (or target broadcast source information) to the first device. The target broadcast source information may include a request for the first device to perform synchronization or stop synchronization for one or more specific BSSs, and this request may be transmitted from the second device to the first device. Accordingly, the first device may perform synchronization on one or more specific BSSs or stop synchronization. In addition, the target broadcast source information may include synchronization related information on the target broadcast source (e.g., synchronization information for one or more of periodic advertisements or broadcast isochronous streams), advertising address related information, metadata, and the like.

Discovery related information transmitted by the second device to the first device may be generated based on BSS information provided from each of one or more BSSs.

The BSS information may include information indicating characteristics of the corresponding BSS. In addition, the BSS information may include information necessary for broadcast discovery of other devices. In addition, the BSS information may include items comparable to other BSSs.

BSS may advertise own BSS information. Advertising of the BSS information may be performed periodically.

For example, the information broadcast by the BSS may include an address, metadata, a content type, and the like, and this may be referred to as BSS information (or broadcast source information). The broadcast source information may be transmitted to other devices through periodic advertisement of the broadcast source.

One or more of the first device or the second device may discover or scan the broadcast source based on broadcast source information broadcast from the one or more BSSs.

In addition, the first device may inform the second device information on a BSS reception state (or, a broadcast reception state). For example, the BSS reception state information may include information on the BSS detected by the first device or being synchronized. The BSS reception state information may include synchronization-related state information for one or more of a periodic advertising of the BSS or a broadcast isochronous stream, which the first device receives.

The criteria for the first device or the second device to determine the priority of the BSS or to select the BSS may be defined in the form of a policy or a profile.

The policy may be configured based on items included in the BSS information. For example, the policy may be configured based on one or a combination of two or more among a plurality of items included in the BSS information. When the policy is configured based on a combination of two or more items, a method in which a priority is given based on the second item when the first item of BSS information of a plurality of BSSs is the same, or a method in which the priority is given based on the combined pair of the first and second items may be applied.

The policy may be preconfigured in the first device, and the second device may apply the policy after confirming the policy of the first device. Alternatively, the second device or a user may directly configure the policy.

For example, the first device may be a BDS server or a server, and the second device may be a BDS client or a client.

Accordingly, power consumption for broadcast discovery of the first device may be reduced. For example, the first device may be a power limited device (e.g., a headset, smart band, hearing aid, etc.). The second device may be a less power-limited device (e.g., a smartphone) compared to the first device.

Figure 21:
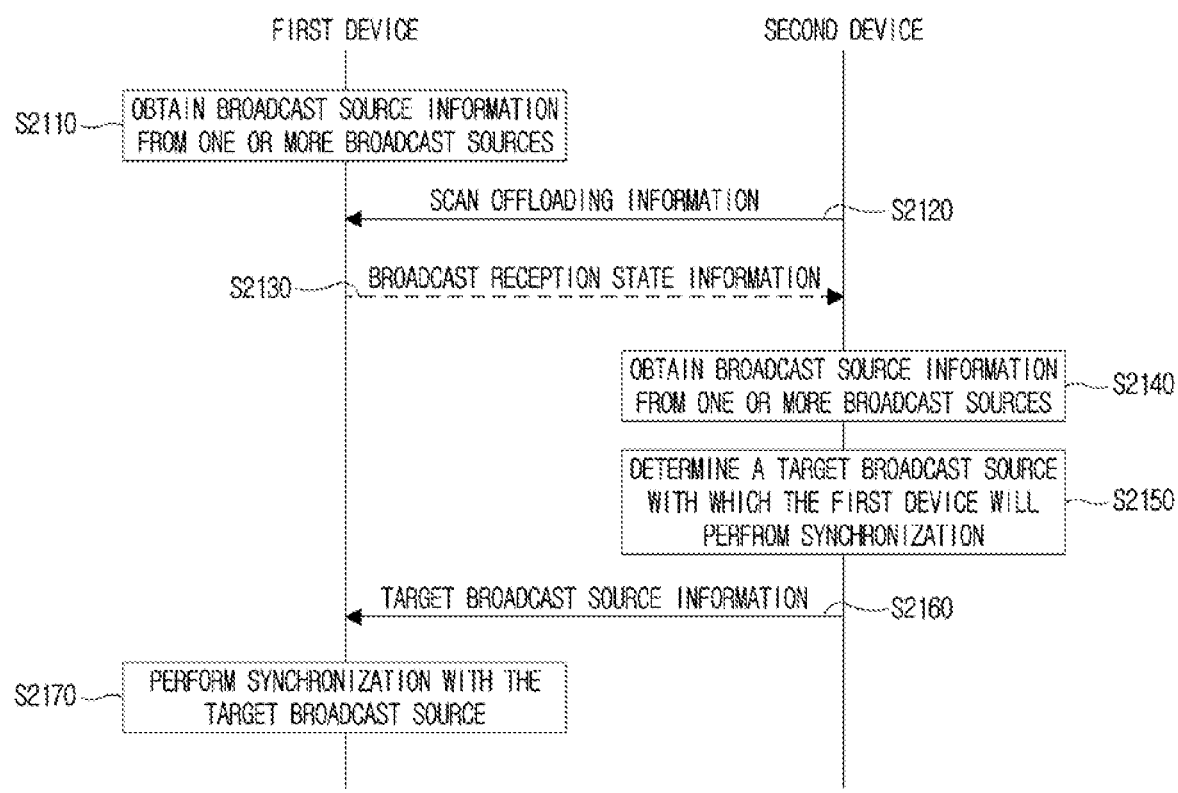
FIG. 21 is a diagram for describing an example of a scan offloading method to which the present disclosure is applicable.

FIG. 21 is a diagram for describing an example of a scan offloading method to which the present disclosure is applicable.

In the step S2110, the first device may obtain broadcast source information (or BSS information) from one or more broadcast sources (or BSS). The first device may establish synchronization with the corresponding broadcast source based on the broadcast source information. In this example, for clarity of explanation, it is assumed that the first device is synchronized to the periodic advertisement (PA) or broadcast isochronous stream of the first broadcast source, and is not synchronized to the PA or broadcast isochronous stream of the second broadcast source.

In step S2120, the first device may obtain information on the scan offloading (or discovery offloading) from the second device. For example, the scan offloading information may include information informing that the second device performs or does not perform scanning (or discovery) of a broadcast source on behalf of the first device. In this example, it is assumed that the first device informs that it can or will perform scan offloading (or remote scanning) on behalf of the second device. If the first device informs that it will not perform scan offloading, the subsequent step may not be performed.

In step S2130, the first device may provide the broadcast reception state to the second device. For example, broadcast reception state information is generated as characteristic information and maintained in the first device. And, in response to a read request from the second device or without a request from the second device, the first device may transmit the broadcast reception state information to the second device. The broadcast reception state information may include a synchronization state of the first device for a PA of a specific broadcast source or synchronization state information for a broadcast isochronous stream. For example, the broadcast reception state information may indicate that the first device is in synchronization with the PA and/or broadcast isochronous stream of the first broadcast source, and that the PA and/or broadcast isochronous stream of the second broadcast source are in a non-synchronization state. In addition, the broadcast reception state information may or may not be provided to the second device. That is, the second device may perform scan offloading on behalf of the first device with reference to or regardless of the broadcast reception state of the first device.

The above-described steps S2110 to S2130 are not limited to being sequentially performed. That is, some or all of steps S2110 to S2130 may be performed in parallel or may be sequentially performed in an order different from the above-described order.

In step S2140, the second device may obtain broadcast source information from one or more broadcast sources.

In operation S2150, the second device may determine a target broadcast source with which the first device will perform synchronization. For example, the second device may perform scanning on behalf of the first device, and determine one or more broadcast sources (i.e., target broadcast sources) with which the first device will perform synchronization.

Specifically, the second device, based on at least one of the broadcast source information obtained in step S2140 or the broadcast reception state information of the first device obtained in step S2130, may determine one or more target broadcast sources with which the first device will synchronize.

In step S2160, the second device may provide the target broadcast source information to the first device.

In step S2170, the first device may perform synchronization with the target broadcast source based on the target broadcast source information.

Figure 22:
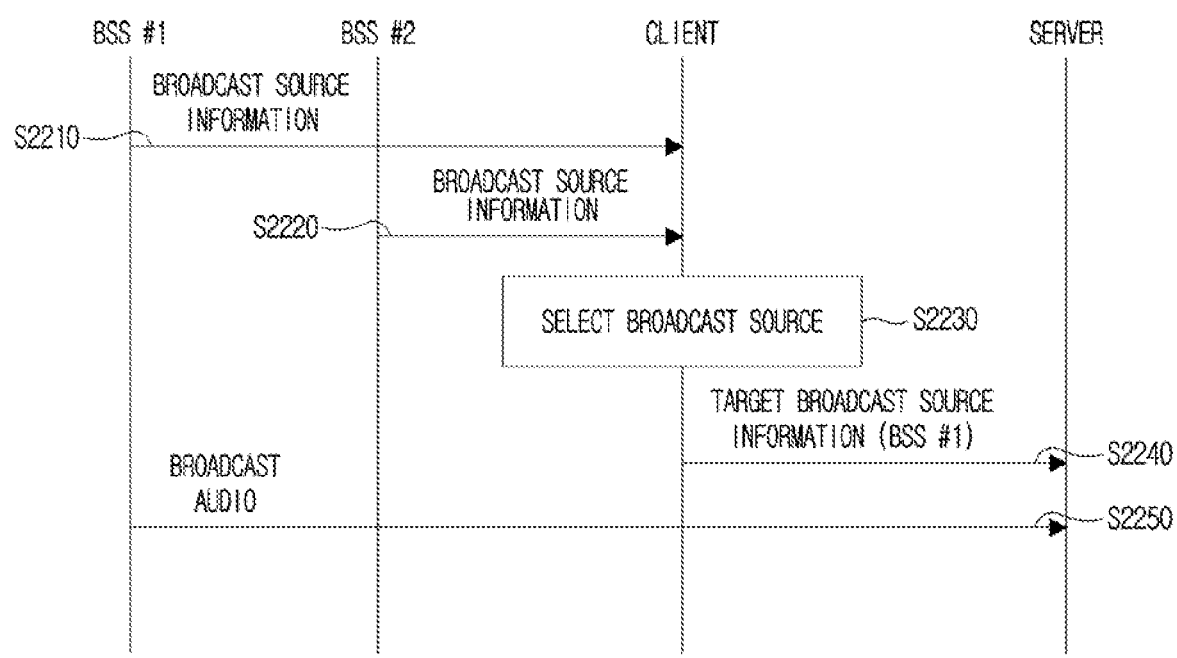
FIG. 22 is a diagram for describing an example of a broadcast source scanning service operation to which the present disclosure is applicable.

FIG. 22 is a diagram for describing an example of a broadcast source scanning service operation to which the present disclosure is applicable.

In steps S2210 and S2220, the first broadcast source (BSS #1) and the second broadcast source (BSS #2) may advertise their own broadcast source information, respectively, and the client or server may receive it. For example, the client (or BDS client or scan offloading client) may be a smartphone, a public TV, or the like. For example, the server (or BD server or scan offloading server) may be a headset or the like.

In step S2230, the client may select a specific BSS based on broadcast source information received from each broadcast source. For example, the client may select a BSS based on a policy for BSS information. For example, the client may select BSS #1. That is, the client may determine that the target broadcast source to which the server performs synchronization is BSS #1.

In step S2240, the client may provide the selected result to the server. For example, the client may transmit information indicating that the target broadcast source to which the server performs synchronization is BSS #1 to the server.

In step S2250, the server may receive broadcast audio data or a stream from the BSS #1 through a procedure such as synchronization with the BSS #1.

For example, a user discover or scan nearby broadcast sources with a client device (e.g., a smartphone) on behalf of a server (e.g., a headset) while moving. Broadcast source scanning may include receiving or listening for broadcast source information. The client may determine one or more target broadcast sources based on the broadcast source information, and transmit the results to a server (e.g., a headset). The server may receive audio from the corresponding target broadcast source based on the information received from the client.

Selecting the target broadcast source by the client may be based on a policy or profile reflecting the priority configured by the user.

Broadcast source information generated and advertised by the broadcast source may include various items such as a language, a content type, a name of a broadcasting station (or broadcast service provider) (e.g., airport, cafe, etc.), an audio content title. For example, the broadcast source information may include one or more items in Table 6 or Table 7 below.

TABLE 6

| Parameter | Description |
| --- | --- |
| Direction | This field takes a single value, representing an Audio Sink (Sink) or an Audio Source (Source). |
| Codec ID | This field takes a single value, which is a Codec ID value, as defined in the Bluetooth Assigned Numbers. |
| Audio Location | List of Audio Locations. This list shall contain at least one entry. Each entry may be a combination of Audio Locations. |
| Channel Mode | List of Channel Modes. This list shall contain at least one entry. |
| Sampling Frequency | List of Sampling Frequencies. This list shall contain at least one entry. |
| Codec-specific parameters | Variable-size codec-specific parameters defined by an implementation or by a higher layer specification. May be empty. |
| Content protection type | This field takes a single value, which is a Content Protection Type value, as defined in the Bluetooth Assigned Numbers. |
| Content protection type specific value | Variable-size content protection type specific value defined by an implementation or by a higher layer specification. May be empty. |

TABLE 7

| Field | Size (octets) | Description |
| --- | --- | --- |
| Service Data AD Type | 1 | Defined in Vol 3, Part C of the Bluetooth Core Specification |
| Targeted Audio Advertisement Service UUID | 2 | Defined in the Bluetooth Assigned Numbers |
| Profile_ID | 2 | Assigned by an implementation or by a higher layer specification. Profile_ID values are defined in the Bluetooth Assigned Numbers |
| Content_Type | 1 | Assigned by an implementation or by a higher layer specification. Content_Type values are defined in the Bluetooth Assigned Numbers |
| Metadata_Length | 1 | Length N in octets of the Metadata field |
| Metadata | N | Profile Metadata |

Table 6 is an example of parameters included in an audio session capability (ASC) record, and Table 7 is an example of fields included in Targeted Audio Advertisement data.

The broadcast source that has generated such broadcast source information may advertise an advertising packet including broadcast source information to nearby devices using a broadcast related protocol (BDS, ASMP (Audio Stream Management Profile), etc.).

The client may generate a policy or a profile by combining the broadcast source information collected from the broadcast source, and may generate a priority for the target broadcast source based thereon. The client may transmit information about the target broadcast source priority to the server.

The broadcast source information used by the client when selecting a broadcast source may include an address, metadata, a content type, and the like. For example, in the example of FIG. 22, BSS information of BSS #1 may include Address #1, metadata, and content type (Doorbell), and BSS information of BSS #2 may include Address #2, metadata, and content type (Media).

The client may define a priority field according to the content type, or the user may configure the priority. For example, the user may configure a doorbell to be more preferred or media to be more preferred among content types. As such, a policy may be defined according to a preferred content type or service. Alternatively, policies may be managed for each service level. For example, the service class may be defined as three classes of high, middle, and low, and a grade may be given to a range of values that each item included in the broadcast source information may have. For example, a high grade may be given to Alert and system sound in the content type, Ringtone and Doorbell are given to the middle grade, and the remaining content types such as media are given to the low grade. Alternatively, the user may directly give priority to a value that each item included in the broadcast source information may have.

Figure 23:
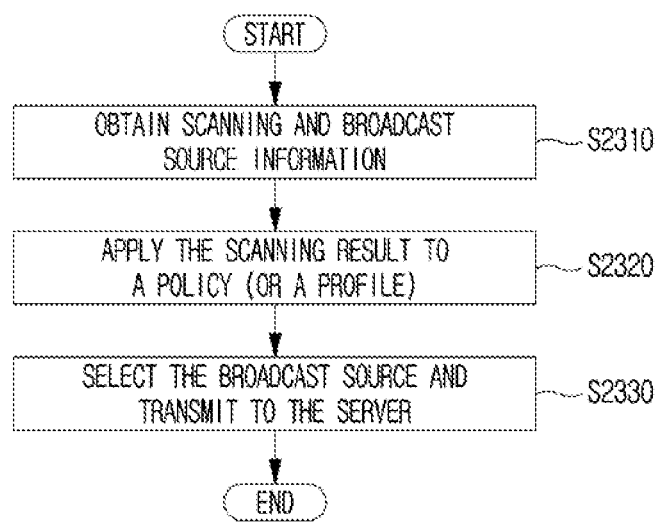
FIG. 23 is a diagram illustrating an example of an operation of a client to which the present disclosure is applicable.

FIG. 23 is a diagram illustrating an example of an operation of the client to which the present disclosure is applicable.

In step S2310, the client may perform broadcast source scanning on behalf of the server and may obtain source information.

In step S2320, the client may apply the broadcast source scanning result to a policy or profile.

In step S2330, the client may select one or more target broadcast sources based on the policy or profile, and transmit information indicating the selected target broadcast source to the server.

Figure 24:
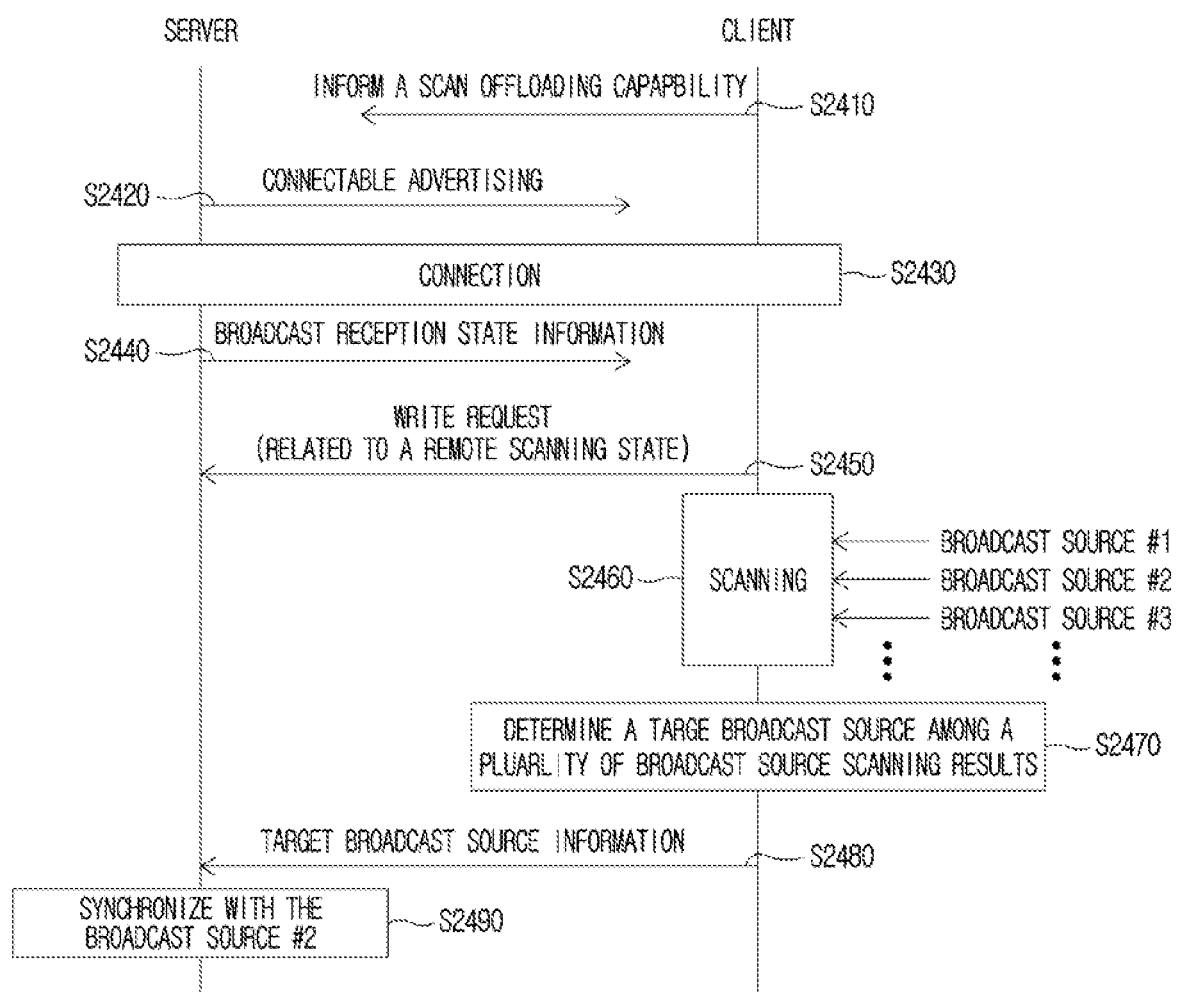
FIG. 24 is a diagram illustrating an additional example of operations of a server and a client to which the present disclosure is applicable.

FIG. 24 is a diagram illustrating an additional example of operations of a server and a client to which the present disclosure is applicable.

A device (e.g., a smart band, hearing aid, headset, etc.) having a constraint on power consumption-related resources may operate as a server (or a BDS server or a scan offloading server). A relatively less power constrained device (e.g., a smartphone) may act as a client (or a BDS client or scan offloading client).

In step S2410, the client may inform that it can provide scan offloading. For example, a client may inform information indicating that it has scan offloading capability to one or more other devices (e.g., a server) in a broadcast manner or on a connection-based basis.

In step S2420, the server may periodically broadcast a connectable advertising signal to establish a connection with another device.

In step S2430, the client may establish a connection with the server according to a procedure such as transmitting a connection request to the server.

In step S2440, the server may inform its current broadcast receive state. For example, the server may provide broadcast reception state information to the client in a broadcast manner before establishing a connection with the client, or on a connection-based basis after establishing a connection with the client. For example, the server may generate and maintain a broadcast reception state characteristic along with other characteristics, and may provide it to the client. The broadcast reception state characteristic may include a first broadcast reception state for the first broadcast source and a second broadcast reception state for the second broadcast source. The broadcast reception state characteristic associated with each broadcast source may include at least one of synchronization-related information for a periodic advertisement (PA) of the corresponding broadcast source or synchronization-related information for a broadcast isochronous stream. This broadcast reception state may indicate whether the server is communicating with a certain broadcast transmitter or is in a state synchronized with a certain broadcast source. The server informing the client of the broadcast reception state on a connection basis may be based on a read request for the broadcast reception state characteristic from the client.

In step S2450, after establishing a connection with the server, the client may inform the server that it intends to perform discovery or scanning on behalf of the server. For example, the state of the server may be modified to a remote discovery state or a remote scanning state through a write request.

Alternatively, after the client and the server establish a connection, information indicating whether or not the client performs scan offloading or remote scanning on behalf of the server may be transmitted to the server. For example, this information may be defined as scan offloading performance characteristics (characteristics) maintained by the server, and the client may modify or update a feature of whether to perform scan offloading through a write request to the server. In addition, a feature of whether to perform scan offloading and a feature of target broadcast source information to be described later may be defined as one piece of feature information or may be defined as separate feature information.

In step S2460, the client may perform scanning. Power consumption for scanning may increase when there are multiple broadcast sources and the scanning interval is long or each broadcast source is different. Accordingly, a client with relatively sufficient power may perform remote scanning on behalf of the server with limited power, thereby reducing power consumption of the server. For example, the client may obtain broadcast source information of broadcast sources #1, #2, #3, . . . . For example, the client may collect information from up to 10 broadcast sources.

In step S2470, the client may determine a target broadcast source based on information on a plurality of broadcast sources obtained through remote scanning performed on behalf of the server. For example, the client may determine the target broadcast source based on metadata included in the broadcast source information. The target broadcast source may include one or more broadcast sources. Also, the target broadcast source information may include synchronization-related information on at least one of a PA or an isochronous stream of the corresponding broadcast source.

In step S2480, the client may transmit the target broadcast source information to the server. For example, the target broadcast source information may be defined as target broadcast source characteristics maintained by the server, and the client may modify or update target broadcast source characteristics through a write request to the server. In addition, the aforementioned scan offloading performance feature and the target broadcast source information feature may be defined as one piece of feature information or may be defined as separate feature information.

In step S2490, the server may perform a synchronization procedure with a specific broadcast source (e.g., broadcast source #2) based on target broadcast source information provided by the client. Accordingly, the server may receive broadcast data (e.g., audio data or stream) from broadcast source #2.

As an additional example, a possible error code may be defined when the client performs scanning on behalf of the server. For example, an error code for a case where the client exceeds a limit on the number of supportable servers may be defined.

Although the above-described example describes a method for the client to select a broadcast source on behalf of the server, the present disclosure is not limited thereto, and the server may select a broadcast source based on information provided from the client.

In addition, in the policy related to the selection or prioritization of broadcast sources, the types of broadcast sources supported by the server, the number of broadcast sources, codec types, codec identifiers, profile identifiers, protocol identifiers, channel types, channel identifiers, and streams An identifier, an audio location identifier, an audio group identifier, an audio scene application (ASA) identifier, an ASS identifier, and the like may be defined.

In addition, the server does not necessarily select one broadcast source, but may select a plurality of broadcast sources, perform synchronization with the plurality of broadcast sources, and receive broadcast data in parallel or sequentially from each broadcast source.

Hereinafter, embodiments for applying broadcast rendering delay according to the present disclosure will be described.

The first device may transmit information indicating a rendering delay value expected until rendering by the second device to the second device.

For example, in an isochronous broadcast or connectionless isochronous stream-related operation, the first device may calculate a rendering delay value expected until rendering by the second device and transmit it to the second device.

Information indicating the rendering delay may be advertised by being included in the broadcast source information.

The second device may adjust the playback timing of the audio data by reflecting the received rendering delay value.

For synchronization between a plurality of second devices, information on rendering delays of one or more second devices may be fed back to the first device. A channel for feedback may be formed between the first device and the second device. A channel for feedback may be formed on a connection basis.

Here, the first device may be a broadcast audio source device, and the second device may be a broadcast audio sink device.

Figure 25:
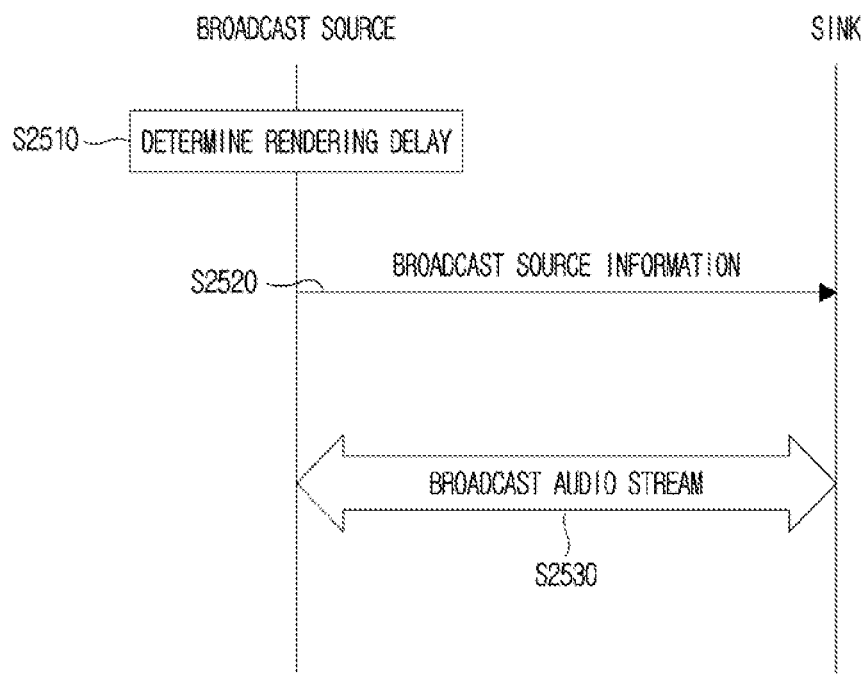
FIGS. 25 and 26 are diagrams for describing a rendering delay determination and transmission method to which the present disclosure is applicable.
Figure 26:
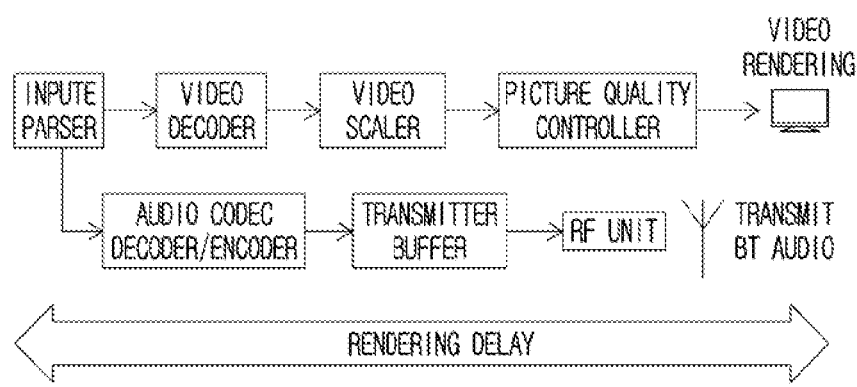

FIG. 25 and FIG. 26 are diagrams for describing a rendering delay determination and transmission method to which the present disclosure is applicable.

In step S2510, the broadcast source (or broadcast audio source) device may determine a rendering delay in the sink device (e.g., an audio data receiving end such as a headset or a phone).

Rendering delay, as shown in FIG. 26, may correspond to a time delay required for the source device to separate video data and audio data (input parser), render the video through the process of decoding (video decoder)-scaling (video scaler)-image composition (picture quality controller) of video data etc., in parallel, for the sink device to render or reproduce audio through the process of decoding/encoding audio data (audio codec decoder/encoder)-buffering (transmitter buffer)-transmission (RF), etc. That is, the source device (or the broadcast source) may determine the rendering delay value by determining or predicting the rendering delay required until the audio rendering in the sink device (or the receiving end).

In step S2520, the rendering delay value determined by the broadcast source may be included in broadcast source information and advertised together with information such as language, content type, and codec identifier.

In step S2530, the sink device may form a broadcast audio stream through a process such as synchronization with the source based on broadcast source information.

For example, when the broadcast source is a TV, the synchronization between the video played on the TV and the audio broadcast by the TV and played on the sink device may not match. Accordingly, when the broadcast source transmits audio in a broadcast manner, the broadcast source may include the rendering delay in the broadcast source information.

Here, various methods may be applied to determine the rendering delay value.

For example, the TV may calculate the time it takes for a video to be rendered according to content characteristics (e.g., resolution, frame rate, etc.).

Alternatively, the manufacturer may collectively determine and input an arbitrary rendering delay value.

Alternatively, the TV application may determine and input the rendering delay value.

Alternatively, when audio synchronization does not match in a sink device (e.g., a headset or a smart phone), it may support a user to manually synchronize the audio.

Figure 27:
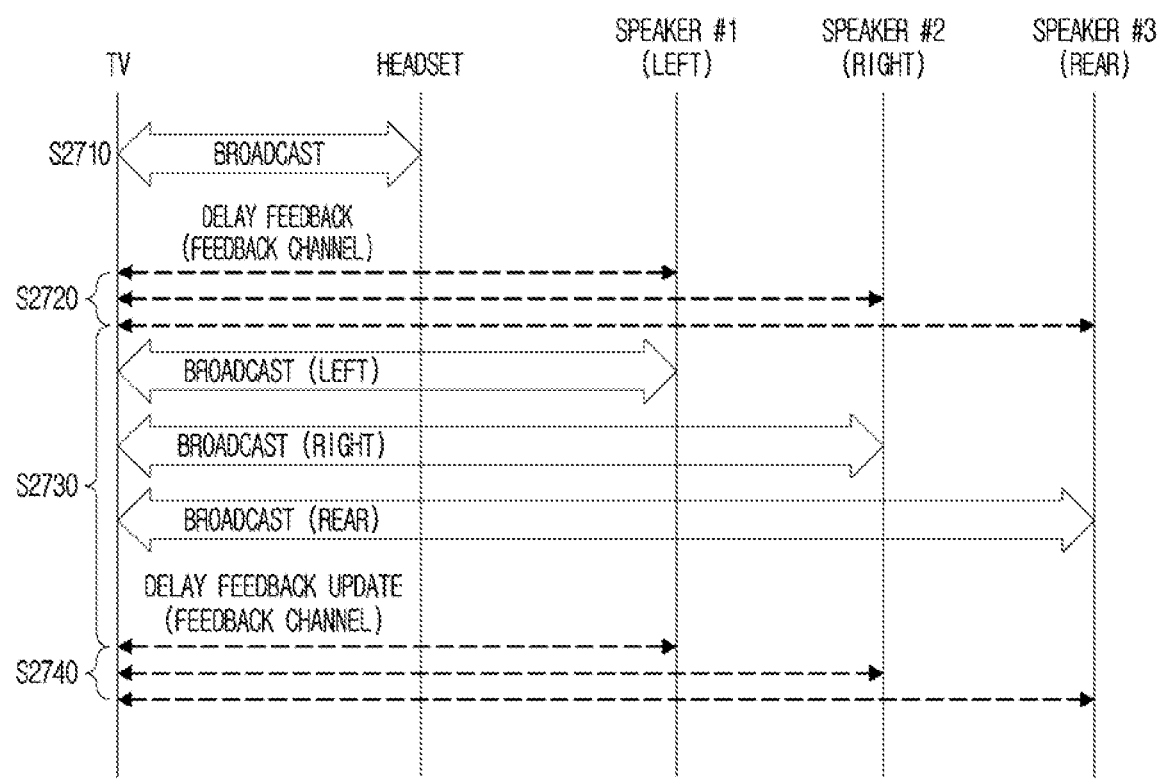
FIG. 27 is a diagram for describing hybrid broadcasting for multi-channel synchronization to which the present disclosure is applicable.

FIG. 27 is a diagram for describing hybrid broadcasting for multi-channel synchronization to which the present disclosure is applicable.

The hybrid broadcasting refers to a method of forming a feedback channel between a source and a sink based on a connection while broadcasting audio data without a connection between the source and the sink.

Multi-channel broadcast may be applied, for example, in the case of simultaneously broadcasting channels such as FR, FL, RR, RL, C, and W in a 5.1CH system.

FIG. 27 exemplarily shows a multi-channel broadcast through three speakers.

When sending multi-channel audio to speakers #1, #2, and #3 by broadcasting, in order to synchronize speakers #1, #2, and #3, a connection-based channel (e.g., For example, a feedback channel) for exchanging delay information between the TV and the speaker may be formed.

The delay information may be periodically exchanged through the established connection-based feedback channel.

For example, in step S2710, the TV may broadcast audio data and the audio may be reproduced through the headset. When a user tries to reproduce multi-channel audio data through a plurality of speakers on behalf of a headset, a problem may occur that the reproduction timing of channels allocated to each of the plurality of speakers is out of synchronization.

In step S2720, the TV and each of the speakers #1, #2, #3 may form a feedback channel, the delay information of each speaker may be transmitted to the TV through the feedback channel.

The TV or TV application may calculate a rendering delay value based on the delay information provided from the speaker and advertise it by including it in the broadcast source information. Each speaker receiving the broadcast source information may adjust an audio reproduction timing based on a rendering delay value applied thereto.

In addition, the TV or TV application may calculate the rendering delay value for each channel when calculating the rendering delay value based on the delay information provided from the speaker. For example, when a plurality of channels are configured between a source and a sink, a rendering delay value may be determined differently for each channel. Accordingly, the TV or TV application may calculate a delay value for each channel based on the delay information provided from the speaker, and advertise the delay value for each channel by including the delay value for each channel in the broadcast source information.

Speaker #1 may receive audio data corresponding to the left channel broadcast from the TV and reproduce the left channel audio at a reproduction timing determined based on the rendering delay value.

Speaker #2 may receive audio data corresponding to the right channel broadcast from the TV and reproduce the right channel audio at a reproduction timing determined based on the rendering delay value.

Speaker #2 may receive audio data corresponding to the rear channel broadcast from the TV and reproduce the rear channel audio at a reproduction timing determined based on the rendering delay value.

Accordingly, all of the left, right, and rear channels may be reproduced in synchronization.

In step S2730, when broadcast audio reproduction through speakers #1, #2, and #3 is started, rendering delay for broadcast audio through the existing headset may not be considered.

As a further example, feedback of rendering delay may be performed by some, but not all, one or more of the multi-channel speakers. In this case, the rendering delay in the remaining non-feedback speakers may be determined based on the fed back rendering delay.

In addition, the rendering delay may be configured in the source device as a default value predetermined by an experimental value for satisfying isochronism, and may be transmitted to the sink device through broadcast source information or the like.

For example, a TV manufacturer may determine a delay value according to a model of a speaker connectable to the corresponding TV in advance. The predetermined delay value may be calculated according to an experiment according to speaker characteristics. For example, even when the manufacturers or models of speakers constituting the 5.1CH are different, the predetermined delay value may be applied or allocated to each speaker. That is, the default delay value included in the broadcast source information does not always apply the same value, but may be adaptively determined according to the characteristics of a speaker or a renderer.

In this way, when the rendering delay is determined on the source device side and transmitted to the sink device side, the sink device may adjust and apply the rendering delay value according to its own device characteristics, rather than applying the rendering delay value as it is.

In step S2740, the delay information of each speaker may be transmitted to the TV through a feedback channel formed between the TV and each of speakers #1, #2, and #3, so that the delay information may be updated.

Figure 28:
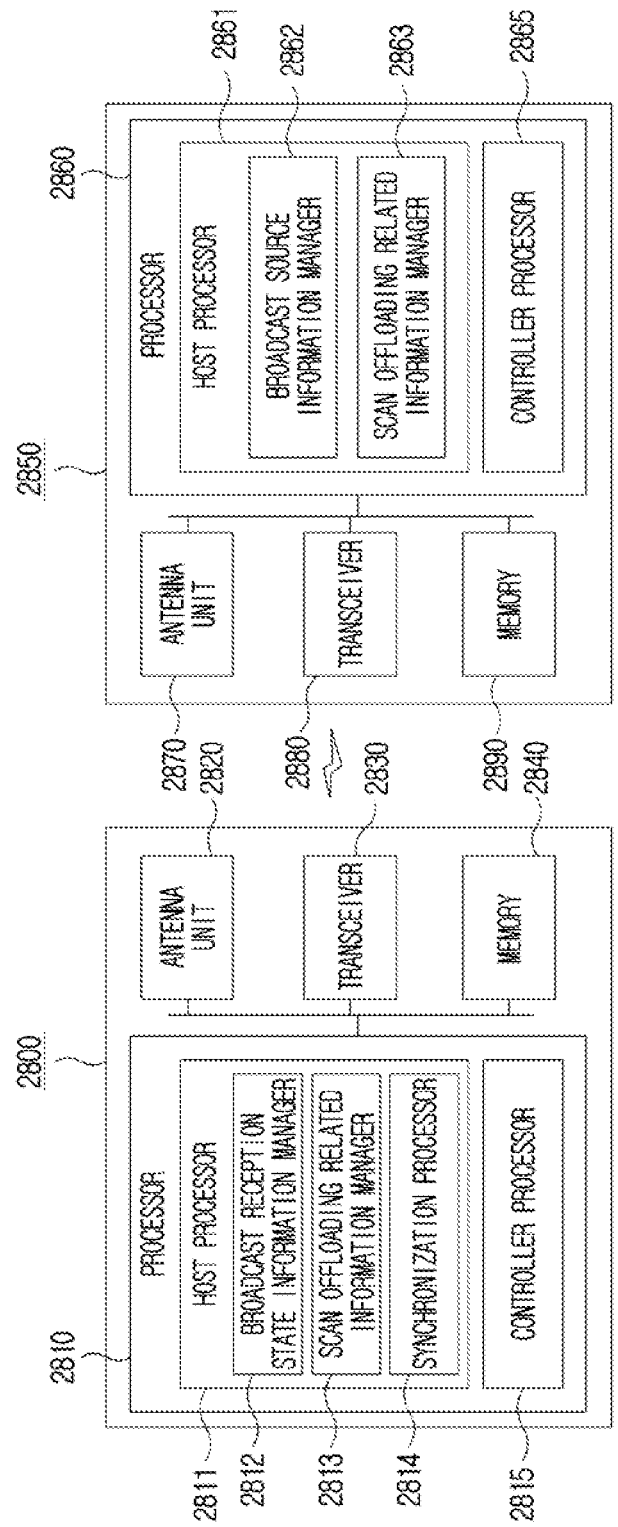
FIG. 28 is a diagram illustrating configurations of a first device and a second device to which the present disclosure may be applied.

FIG. 28 is a diagram illustrating a configuration of the first device and the second device to which the present disclosure is applicable.

The first device 2800 may include a processor 2810, an antenna unit 2820, a transceiver 2830, and a memory 2840.

The processor 2810 may perform baseband-related signal processing and may include a host processor 2811 and a controller processor 2815. The host processor 2811 and the controller processor 2815 may exchange information through HCI. The host processor 2811 may process operations such as L2CAP, ATT, GATT, GAP, and LE profile layers. The controller processor 2815 may process operations such as LL and PHY layers. The processor 2810 may control the overall operation of the first device 2800 in addition to performing baseband-related signal processing.

Antenna unit 2820 may include one or more physical antennas.

The transceiver 2830 may include RF (Radio Frequency) transmitter and RF receiver. The memory 2840 may store information processed by the processor 2810 and software, an operating system, and an application related to the operation of the first device 2800, and may include components such as a buffer and the like.

The processor 2810 of the first device 2800 may be configured to implement an operation of the first device (or, the server) in the embodiments described in the present disclosure.

For example, the host processor 2811 of the processor 2810 of the first device 2800 may include a broadcast reception state manager 2812, a scan offloading related information manager 2813, and a synchronization processor 2814.

The broadcast reception state information manager 2812 may generate, maintain, and manage broadcast reception state information including a periodic advertisement for one or more broadcast sources or synchronization related information for one or more of the broadcast isochronous streams, received by the first device 2800.

The scan offloading related information manager 2813 may generate, maintain, and manage information on whether to perform scan offloading indicating whether the second device 2850 performs scanning on behalf of the first device 2800 and target broadcast source information provided from the second device 2850. At least one of scan offloading performance information and target broadcast source information may be modified or updated according to a request from the second device 2850.

The synchronization processor 2814 may perform synchronization with the target broadcast source based on the target broadcast source information provided by the second device 2850.

The second device 2850 may include a processor 2860, an antenna unit 2870, transceiver 2880, and a memory 2890.

The processor 2860 may perform baseband-related signal processing and may include a host processor 2861 and a controller processor 2865. The host processor 2861 and the controller processor 2865 may exchange information through HCI. The host processor 2861 may process operations such as L2CAP, ATT, GATT, GAP, and LE profile layers. The controller processor 2865 may process operations of the LL layer, the PHY layer, and the like. The processor 2860 may control the overall operation of the second device 2860 in addition to performing baseband-related signal processing.

The antenna unit 2870 may include one or more physical antennas. The transceiver 2880 may include an RF transmitter and an RF receiver. The memory 2890 may store information processed by the processor 2860 and software, an operating system, and an application related to the operation of the second device 2850, and may include components such as a buffer and the like.

The processor 2860 of the second terminal device 2850 may be configured to implement the operation of the second device (or client) in the embodiments described in the present disclosure.

For example, the host processor 2861 of the processor 2860 of the first device 2800 may include a broadcast source information manager 2862, a scan offloading related information manager 2863.

The broadcast source information manager 2862 may generate, maintain, and manage information on broadcast sources around the second device 2850 that the second device 2850 directly obtains. Additionally, the broadcast source information manager 2862 may generate, maintain, and manage broadcast source information based on broadcast reception state information provided from the first device 2800.

The scan offloading related information manager 2863 may generate, maintain, and manage information on whether to perform scan offloading indicating whether the second device 2850 performs scanning on behalf of the first device 2800, and target broadcast source information on which the first device 2800 will or will not perform synchronization. The target broadcast source may be determined based on at least one of broadcast reception state information of the first device 2800 or broadcast source information directly obtained by the second device 2850. Information on whether scan offloading is performed and information on a target broadcast source may be provided to the first device 2800.

In the operation of the first device 2800 and the second device 2850, the descriptions of the server and the client in the examples of the present invention may be applied in the same manner, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a high-speed random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor(s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/containers.

INDUSTRIAL APPLICABILITY

Embodiments of the present disclosure may be applied to various wireless communication systems to increase the performance of the wireless communication system.

The invention claimed is:

1. A method for a broadcast audio scan service performed by a second device in a wireless communication system, the method comprising:
transmitting, by the second device to a first device, information indicating that the second device performs scanning on behalf of the first device, wherein the first device supports at least one characteristic related to the broadcast audio scan service and the second device accesses the at least one characteristic of the first device;
obtaining, by the second device from the first device, broadcast reception state information on the first device,
wherein the broadcast reception state information represents a current synchronization state of the first device with respect to each of one or more broadcast sources, and
wherein the current synchronization state includes at least one of a periodic advertisement synchronization state or a broadcast isochronous stream synchronization state; and
transmitting, by the second device to the first device, information on a target broadcast source requesting the first device to synchronize to at least one of the periodic advertisement or the broadcast isochronous stream of the target broadcast source.

2. The method of claim 1, wherein:
based on the information on the target broadcast source, synchronization with the target broadcast source by the first device is performed.

3. The method of claim 1, wherein:
the target broadcast source is determined based on at least one of the broadcast reception state information on the first device, or information on the one or more broadcast sources obtained by the second device.

4. The method of claim 3, wherein:
the information on the one or more broadcast sources includes metadata transmitted through a periodic advertisement of each of the one or more broadcast sources.

5. The method of claim 1, wherein:
the information on the target broadcast source includes at least one of synchronization-related information for the target broadcast source, address-related information, or metadata.

6. The method of claim 1, wherein:
the target broadcast source is determined based on a priority related to a content type, or metadata included in information on the one or more broadcast sources obtained by the second device.

7. The method of claim 6, wherein:
the metadata or the priority related to the content type is included in policy information configured by a user of at least one of the first device or the second device.

8. The method of claim 1, wherein:
the first device is a server and the second device is a client.

9. A method for a broadcast audio scan service performed by a first device in a wireless communication system, the method comprising:
receiving, by the first device from a second device, information indicating that the second device performs scanning on behalf of the first device, wherein the first device supports at least one characteristic related to the broadcast audio scan service and the second device accesses the at least one characteristic of the first device;
providing, by the first device to the second device, broadcast reception state information on the first device,
wherein the broadcast reception state information represents a current synchronization state of the first device with respect to each of one or more broadcast sources, and
wherein the current synchronization state includes at least one of a periodic advertisement synchronization state or a broadcast isochronous stream synchronization state; and
receiving, by the first device from the second device, information on a target broadcast source requesting the first device to synchronize to at least one of the periodic advertisement or the broadcast isochronous stream of the target broadcast source.

10. The method of claim 9, wherein:
based on the information on the target broadcast source, synchronization with the target broadcast source by the first device is performed.

11. The method of claim 9, wherein:
the target broadcast source is determined based on at least one of the broadcast reception state information on the first device, or information on the one or more broadcast sources obtained by the second device.

12. The method of claim 11, wherein:
the information on the one or more broadcast sources includes metadata transmitted through a periodic advertisement of each of the one or more broadcast sources.

13. The method of claim 9, wherein:
the information on the target broadcast source includes at least one of synchronization-related information for the target broadcast source, address-related information, or metadata.

14. The method of claim 9, wherein:
the target broadcast source is determined based on a priority related to a content type, or metadata included in information on the one or more broadcast sources obtained by the second device.

15. The method of claim 14, wherein:
the metadata or the priority related to the content type is included in policy information configured by a user of at least one of the first device or the second device.

16. The method of claim 9, wherein:
the first device is a server and the second device is a client.

17. A second device for performing a broadcast audio scan service in a wireless communication system, the device comprising:
a memory;
a transceiver; and
a processor,
wherein the processor is configured to:
transmit, to a first device through the transceiver, information indicating that the second device performs scanning on behalf of the first device, wherein the first device supports at least one characteristic related to the broadcast audio scan service and the second device accesses the at least one characteristic of the first device;
obtain, from the first device through the transceiver, broadcast reception state information on the first device,
wherein the broadcast reception state information represents a current synchronization state of the first device with respect to each of one or more broadcast sources, and
wherein the current synchronization state includes at least one of a periodic advertisement synchronization state or a broadcast isochronous stream synchronization state; and
transmit, to the first device through the transceiver, information on a target broadcast source requesting the first device to synchronize to at least one of the periodic advertisement or the broadcast isochronous stream of the target broadcast source.

18. A first device for performing scan offloading by another device in a wireless communication system, the device comprising:
a memory;
a transceiver; and
a processor;
wherein the processor is configured to:
receive, from a second device through the transceiver, information indicating that the second device performs scanning on behalf of the first device, wherein the first device supports at least one characteristic related to the broadcast audio scan service and the second device accesses the at least one characteristic of the first device;
provide, to the second device, broadcast reception state information on the first device,
wherein the broadcast reception state information represents a current synchronization state of the first device with respect to each of one or more broadcast sources, and
wherein the current synchronization state includes at least one of a periodic advertisement synchronization state or a broadcast isochronous stream synchronization state; and
receive, from the second device through the transceiver, information on a target broadcast source requesting the first device to synchronize to at least one of the periodic advertisement or the broadcast isochronous stream of the target broadcast source.

* * * * *